(12) United States Patent
Leonida

(10) Patent No.: US 8,105,722 B2
(45) Date of Patent: *Jan. 31, 2012

(54) FUEL CELL SYSTEM SUITABLE FOR ORGANIC FUELS AND A METHOD OF OPERATION OF THE SAME

(76) Inventor: Andrei Leonida, West Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/154,886

(22) Filed: Jun. 7, 2011

(65) Prior Publication Data

US 2011/0236776 A1 Sep. 29, 2011

Related U.S. Application Data

(60) Continuation-in-part of application No. 12/869,167, filed on Aug. 26, 2010, and a division of application No. 11/588,200, filed on Oct. 26, 2006, now Pat. No. 7,807,305.

(60) Provisional application No. 60/731,054, filed on Oct. 28, 2005.

(51) Int. Cl.
*H01M 8/02* (2006.01)
*H01M 8/18* (2006.01)
*H01M 4/86* (2006.01)
*H01M 8/06* (2006.01)

(52) U.S. Cl. ......... 429/418; 429/405; 429/416; 429/422

(58) Field of Classification Search .................. 405/405, 405/416, 422

See application file for complete search history.

(56) References Cited

U.S. PATENT DOCUMENTS

2003/0062270 A1 * 4/2003 McAlister ..................... 205/697

FOREIGN PATENT DOCUMENTS

| GB | 1146900 | * | 3/1969 |
| JP | 06-325782 | * | 11/1994 |
| JP | 07-078627 | * | 3/1995 |

* cited by examiner

*Primary Examiner* — Ula C Ruddock
*Assistant Examiner* — Amanda Barrow
(74) *Attorney, Agent, or Firm* — Michaud-Kinney Group LLP

(57) ABSTRACT

A fuel cell system includes a first electrode-electrolyte assembly having a first electrode coupled to one side of the first electrode-electrolyte assembly and a second electrode coupled to an opposite side of the first electrode-electrolyte assembly and a second electrode-electrolyte assembly having a third electrode coupled to one side of the second electrode-electrolyte assembly and a fourth electrode coupled to an opposite side of the second electrode-electrolyte assembly. A first conduit is in fluid communication with the first electrode and a second conduit is in fluid communication with the fourth electrode and an electrically conductive mesh positioned between the second electrode and the third electrode. Portions of the second and third electrodes engage each other through apertures defined by the mesh. The fuel cell system also includes an electricity source connected to the first and second electrodes; and an electrical circuit connected to the first conduit and the second conduit.

11 Claims, 19 Drawing Sheets

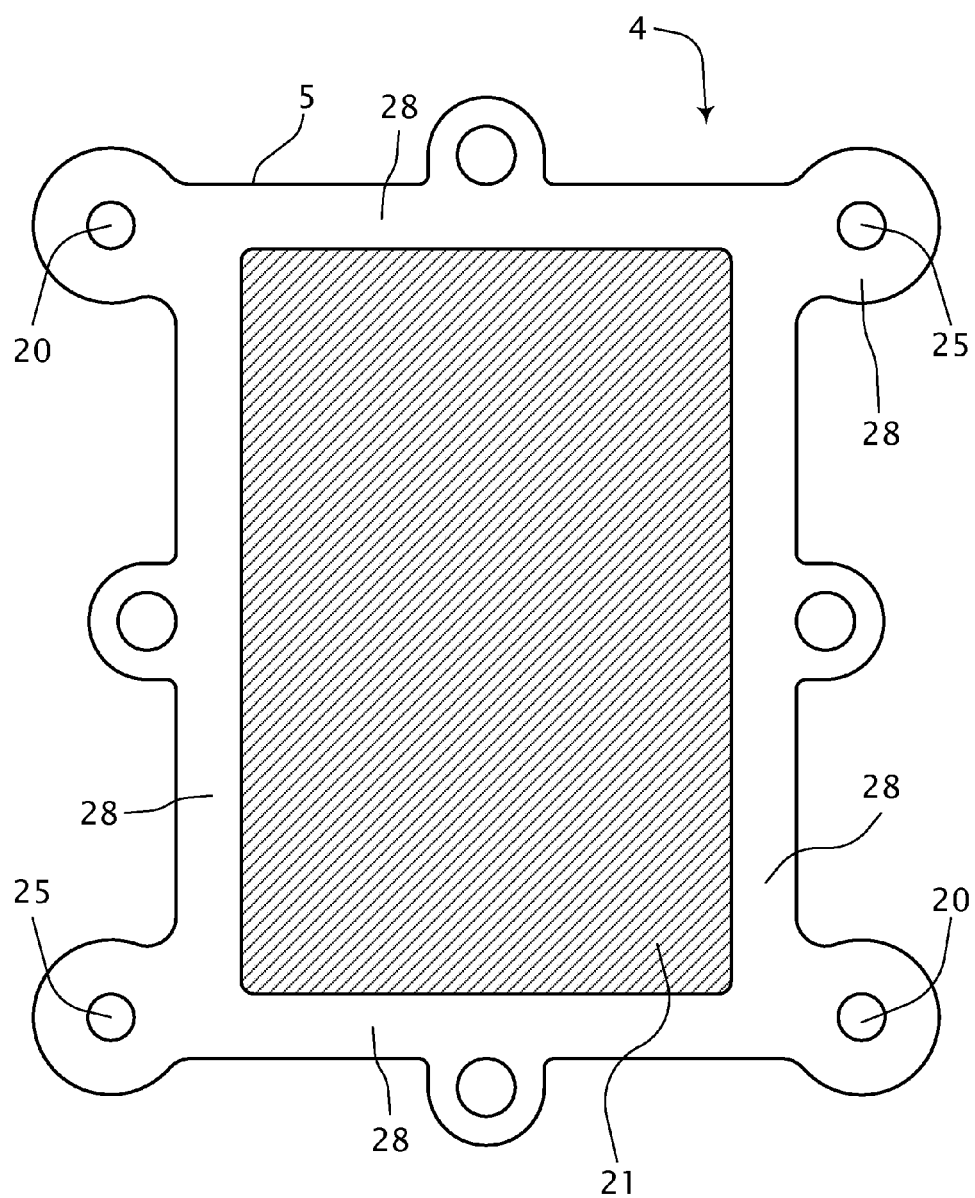

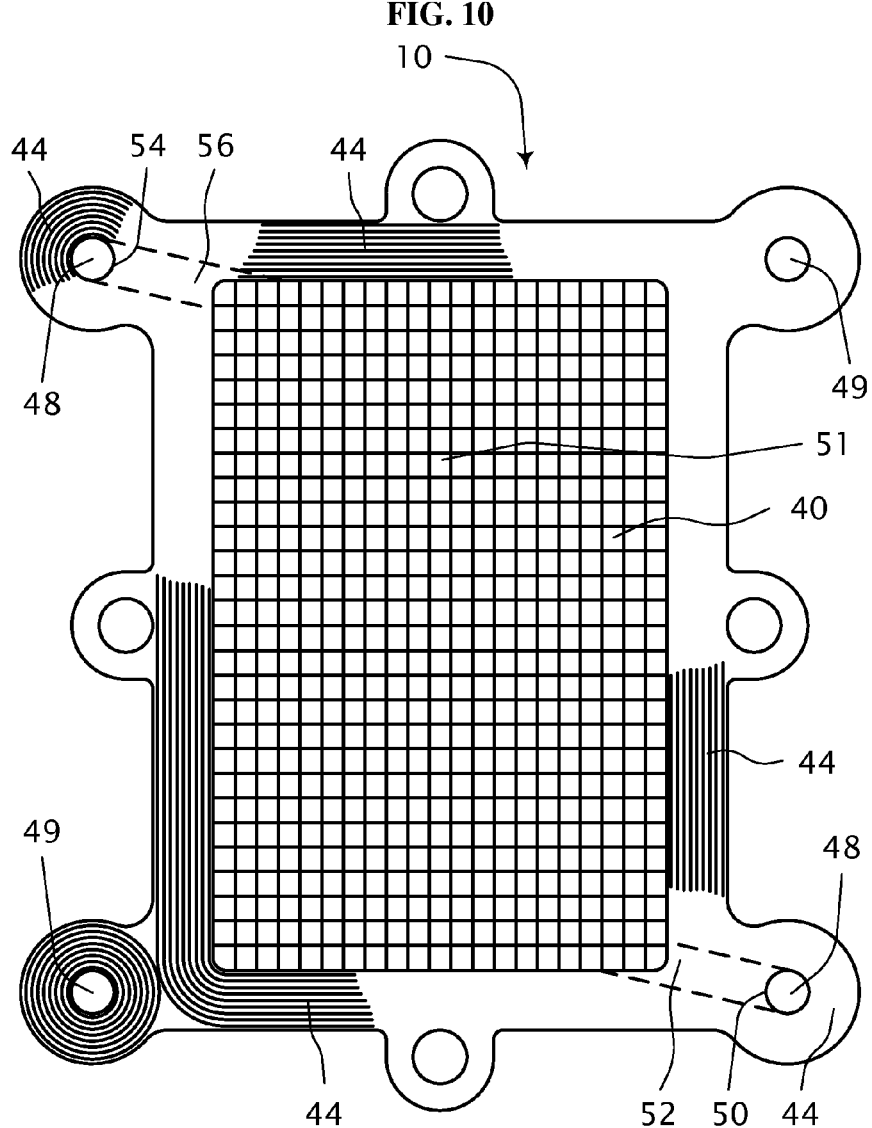

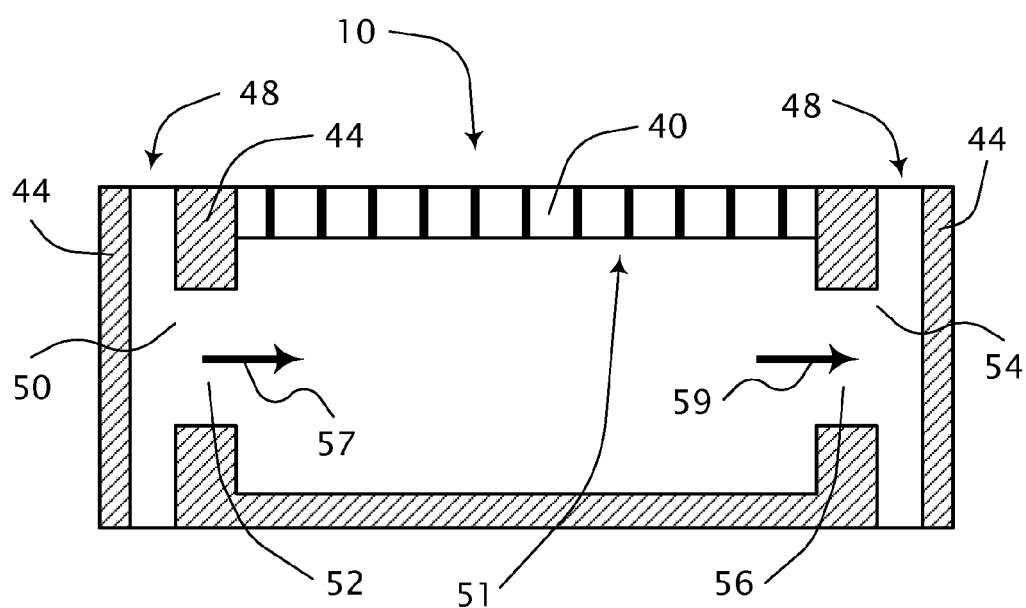

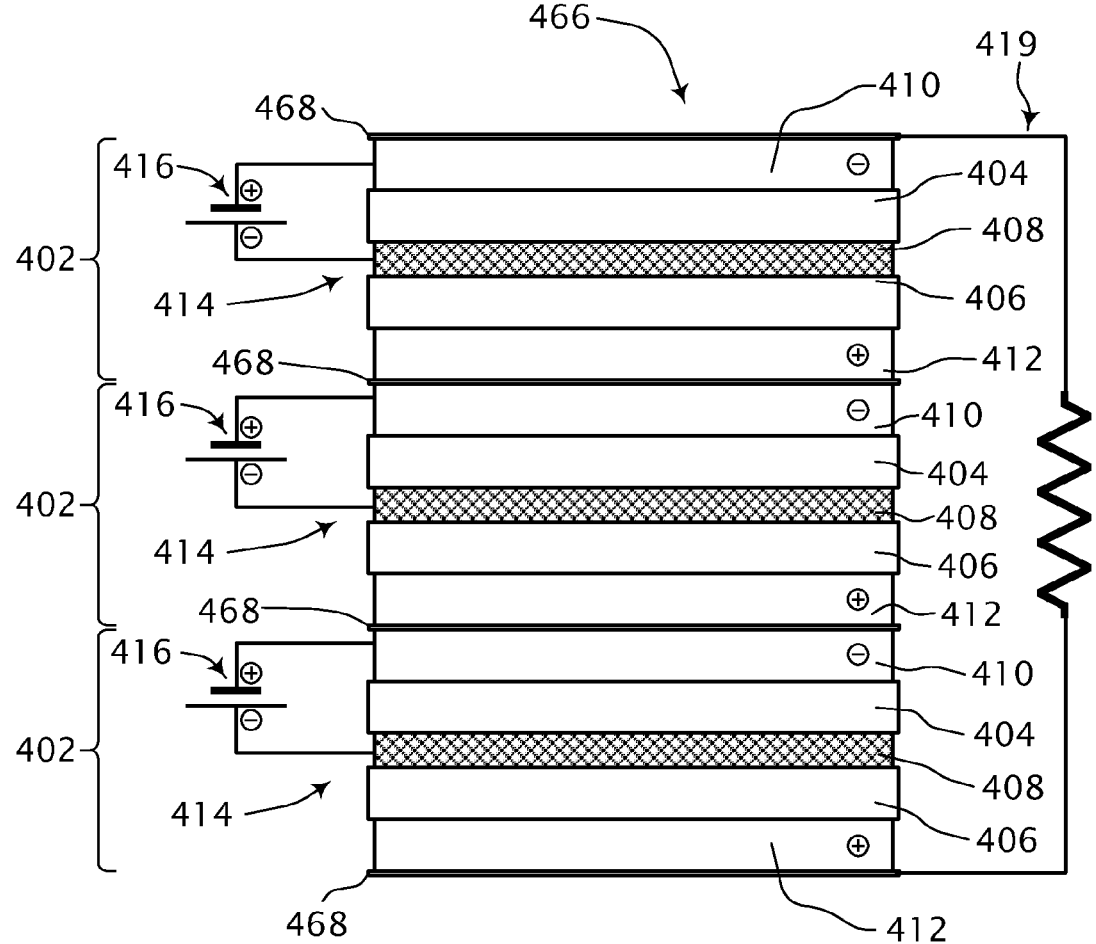

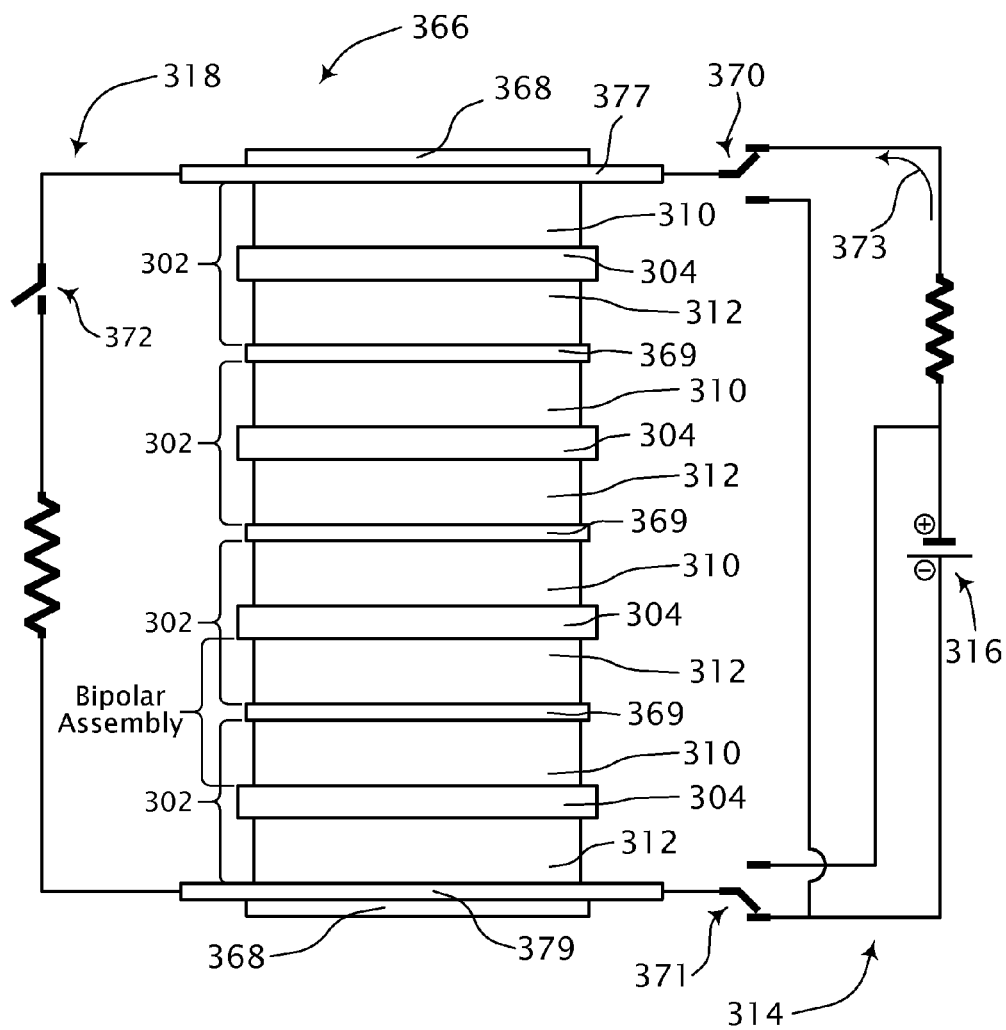

FUEL CELL SYSTEM SUITABLE FOR ORGANIC FUELS AND A METHOD OF OPERATION OF THE SAME

CROSS REFERENCE TO RELATED APPLICATIONS

This application is a continuation in part of U.S. patent application Ser. No. 12/869,167, filed Aug. 26, 2010, which is a divisional application of U.S. patent application Ser. No. 11/588,200, now U.S. Pat. No. 7,807,305, filed on Oct. 26, 2006, which claims priority from U.S. Provisional Patent Application Ser. No. 60/731,054, filed Oct. 28, 2005, the disclosures of which are incorporated by reference herein in their entirety.

FIELD OF THE INVENTION

The present invention is generally directed to a fuel cell and fuel processing system and a method of operating the same; and is more specifically directed to ambient temperature processing of fuel internal to the fuel cell system by electrochemical means.

BACKGROUND OF THE INVENTION

Fuel cells are comprised of electrochemical devices used for providing an environmentally clean method for generating electricity. What makes fuel cells different from another electrochemical energy converter, such as a battery, is the fact that both fuel and oxidant are continuously supplied to their respective electrodes, and reaction products are continuously removed from the fuel cell. Electric current will continue to flow essentially as long as fuel and oxidant are supplied to the electrodes. Fuel cell systems can be formed by stacking and electrically connecting many electrochemical cells together to provide power generation for residential, commercial and industrial scale power applications. Individual fuel cells in fuel cell systems each include at least two catalytic electrodes in contact with an electrolyte medium comprising an electrode-electrolyte assembly. The individual fuel cells also include devices for managing fuel and oxidant flows thereto and for controlling temperature within operating limits. Use of pure hydrogen gas as a fuel results in higher fuel cell energy density outputs compared to other fuels. However, hydrogen gas has a number of drawbacks including: flammability; storage difficulties; and comparatively high production costs.

Naturally occurring organic fuels as well as synthetic fuels can form hydrogen gas external to the fuel cell system using an endothermic chemical reaction such as steam reforming. Natural gas, propane, and diesel are convenient fuel choices since they are widely available. Processing of natural gas, propane and diesel fuels results in a gaseous mixture of hydrogen and carbon dioxide and reaction intermediates such as carbon monoxide. Steam reforming is limited mostly to steady state fuel cell operations at temperatures much higher than ambient temperature. Various fuel cell designs have utilized steam reformers external to the fuel cell to allow cooling of the fuel prior to use in a fuel cell which operates at near ambient temperatures. Steam reforming outside a fuel cell increases cost and does not provide improved transient load following capability. Hydrogen gas generated by steam reformers external to the fuel cell could be accumulated in a storage facility for subsequent use. However, storage of highly flammable fuels such as hydrogen gas is dangerous. Moreover hydrogen storage facilities generally limit fuel cells to stationary applications.

The performance of fuel cells using catalytic electrodes can degrade due to catalyst deactivation and poisoning by the reaction intermediates such as carbon monoxide (CO), especially near ambient operating temperature. Hydrogen gas produced by steam reforming of hydrocarbons can contain 1.5% by volume or more of CO. For catalytic electrodes comprising platinum, carbon monoxide could be a poisoning intermediate at ambient temperature. Elevation of the operating temperature of the fuel cell to about 200° C. can eliminate such poisoning. While elevating the operating temperature of the fuel cell may be practical in some fuel cell applications operating continuously at or near steady state, it is difficult to implement for applications that use the fuel cell on a transient or as-needed basis and makes the use of polymer electrolyte assemblies impractical. Polymer electrolytes need liquid water in their make-up in order to be electrically conductive and their use in fuel cells is, therefore, limited to temperatures below the boiling point of water. This requires purification of the reformer gas stream to lower its CO content below about ten parts per million (10 ppm). Larger concentrations may negatively impact the fuel cell performance. Typically, purification is accomplished by separate reaction and/or adsorption of the poisoning intermediates. This adds complexity to the system, has a negative impact on system load following capability, adds to the overall cost and reduces system reliability. Modifications of fuel cell electrodes to utilize hydrogen with a higher content of poisoning intermediates include the use of ruthenium in the catalyst on the electrodes, which can lower operating temperature requirements below the boiling point of water. However, fuel cells comprising ruthenium containing catalytic electrodes are more expensive and are typically operated above ambient temperature.

There is a need to provide a fuel cell system including a fuel processing device/system capable of processing fuels with poisoning intermediates, internal to the fuel cell and at or near ambient temperature. Prior art methods and systems for addressing these needs for portable or transient applications were either too expensive, inefficient, or ineffective or a combination of all of these. Based on the foregoing, it is the general object of the present invention to improve upon or overcome the problems and drawbacks of the prior art.

SUMMARY OF THE INVENTION

According to one aspect of the present invention, a fuel cell system includes a first electrode-electrolyte assembly having a first catalytic electrode coupled to one side of the first electrode-electrolyte assembly, and a second catalytic electrode coupled to a generally opposite side of the first electrode-electrolyte assembly. The fuel cell system also includes a first conduit in fluid communication with the first catalytic electrode. The first conduit is configured to deliver fuel to the first catalytic electrode. The fuel cell system also includes a second electrode-electrolyte assembly having a third catalytic electrode coupled to one side of said second electrode-electrolyte assembly, and a fourth catalytic electrode coupled to a generally opposite side of the second electrode-electrolyte assembly. An electrically conductive mesh is positioned between and is in sealing engagement with the second catalytic electrode and said third catalytic electrode. Portions of the second and third catalytic electrodes engage each other through apertures defined by the mesh. A second conduit is in fluid communication with the fourth catalytic electrode. The second conduit is configured to deliver an oxidant, such as air, to the fourth catalytic electrode. An electrical circuit including an electricity source, is in communication with the first catalytic electrode the second catalytic electrode. Another electrical circuit is connected to the first conduit and the second conduit. The other electrical circuit is configured to convey electrical current generated by the fuel cell system.

According to another aspect of the present invention, the electricity source has a positive terminal in electrically conductive communication with the first catalytic electrode and a negative terminal in electrically conductive communication with the second catalytic electrode. The electrical potential generating device is configured to provide process energy sufficient to form hydrogen ions and to remove poisons from the first catalytic electrode and to permit the hydrogen ions to diffuse through the first electrode-electrolyte assembly to the third catalytic electrode.

In another aspect disclosed herein, the first electrode-electrolyte assembly, the mesh and the second electrode-electrolyte assembly operate at a current density of about 0.02 amperes per $cm^2$ to about 0.06 amperes per $cm^2$ and a temperature of about 40° C. to about 60° C. In addition, the electricity source can remove carbon monoxide poisons from the first catalytic electrode at a voltage of about 0.024 volts to about 0.167 volts and a current density of about 0.003 amperes per $cm^2$ to about 0.02 amperes per $cm^2$.

DESCRIPTION OF THE DRAWINGS

FIG. 2 is a top view of an electrode-electrolyte assembly.

FIG. 10 is a top view of a conduit.

FIG. 11 is a schematic drawing of a cross section of the conduit.

FIG. 13A is a schematic drawing of a plurality of fuel cell systems of FIG. 1A arranged in a bipolar stack.

FIG. 19 is a schematic drawing of a plurality of the fuel cells of FIG. 14.

DETAILED DESCRIPTION OF THE PREFERRED EMBODIMENT

Figure 1:
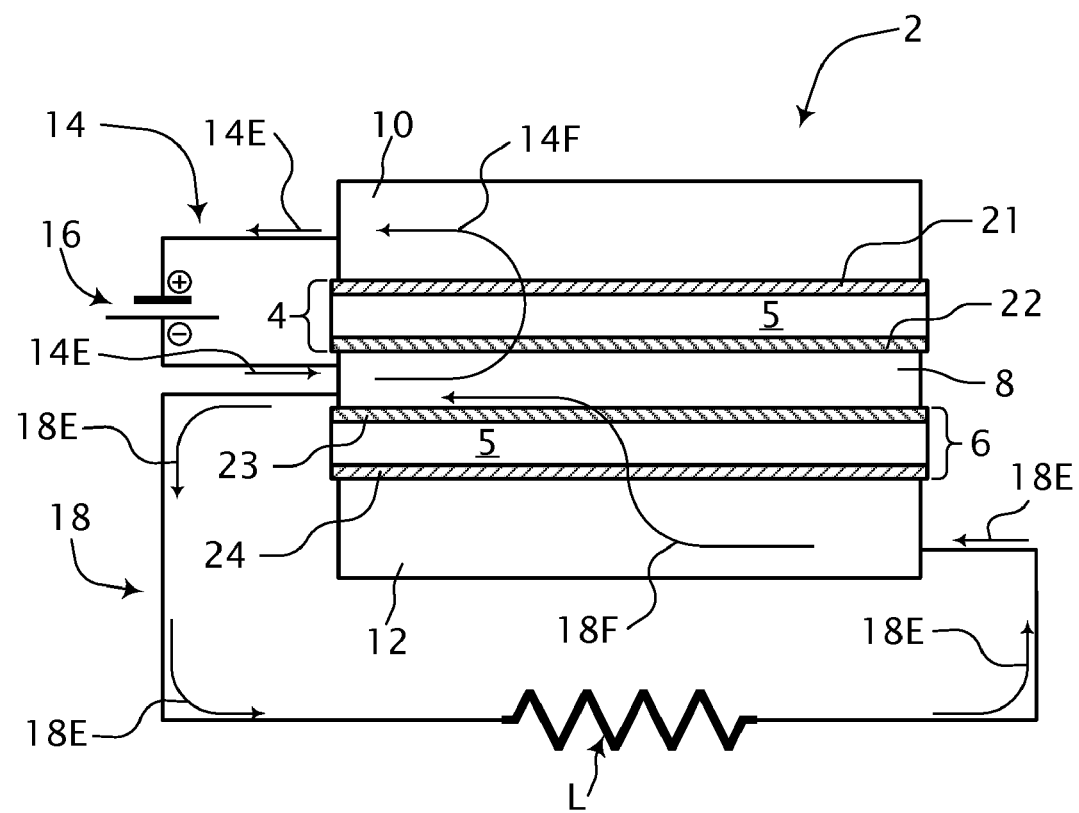
FIG. 1 is a schematic drawing of the fuel cell system of the present invention.

Referring to FIG. 1, a single cell fuel cell system is shown generally at 2. The fuel cell system 2 includes a first electrode-electrolyte assembly 4, a second electrode-electrolyte assembly 6 and an electrically conductive mesh 8 disposed therebetween and in sealing engagement therewith. A first conduit 10 is in fluid communication with one side of the first electrode-electrolyte assembly 4 and a second conduit 12 is in fluid communication with one side of the second electrode-electrolyte assembly 6. At least portions of the first and second conduits 10, 12 comprise an electrically conductive material, such that the first and second conduits are in electrical communication with the first electrode-electrolyte assembly 4 and the second electrode-electrolyte assembly 6, respectively. The fuel cell system 2 includes a first electrical circuit 14 including an electricity source 16 such as a battery, capacitor and/or electrical generator for providing process energy in the form of a first electrical potential. One side of the first electrical circuit 14 is connected to the first electrode 21, for example, via the first conduit 10 or other suitable terminal (not shown). Another side of the first electrical circuit 14 is connected to the second catalytic electrode 22, for example, via the mesh 8 or other suitable terminal (not shown). In addition, a second electrical circuit 18 includes one side connected to the third catalytic electrode 23, for example, via the mesh 8 or other suitable terminal (not shown). The second electrical circuit 18 includes another side connected to the fourth catalytic electrode 24, for example, via the second conduit 12 or other suitable terminal (not shown). The second electrical circuit conveys current generated by the fuel cell system for consumption by an electrical load such as a resistor. A plurality of the fuel cell systems 2 may be connected together in an electrical series circuit or arranged in a stack with suitable fluid distribution hardware.

Referring to FIGS. 1-2, the first electrode-electrolyte assembly 4 includes an electrolyte membrane 5, preferably formed of an ion exchanging polymer, the electrolyte membrane has a first electrode 21 and a second electrode 22 preferably catalytic electrodes applied onto opposing surfaces thereof. Similarly, the second electrode-electrolyte assembly 6 includes an electrolyte membrane 5, preferably formed of an ion exchanging polymer, has a third electrode 23 and a fourth electrode 24 preferably catalytic electrodes applied onto opposing surfaces thereof. The first, second, third and fourth electrodes can be applied to the opposing surfaces of the respective electrolyte membranes by one or more suitable processes, including but not limited to: 1) hotpressing, 2) screen-printing, and 3) direct exchange from aqueous solution followed by reduction to metallic catalyst inside the membrane surface layer. The polymer electrolyte membrane 5 is generally a soft compliant material, comprising any ion-conductive material and is generally a hydrocarbon resin or a fluorocarbon resin capable of facilitating ion transfer in two directions. For hydrocarbon resins, phenolic-based materials are of particular use. Fluorocarbon resins are particularly useful for providing resistance in chemically corrosive environments. Suitable materials from which the electrodes can be fabricated include, but are not limited to, platinum, palladium, rhodium, gold, tungsten, tantalum, ruthenium, and alloys and combinations of the foregoing. The present invention is not limited in this regard, and other membrane materials and electrode materials are within the scope of the invention.

The first electrode-electrolyte assembly 4 also includes through holes 20, 25 and a sealing area 28. The second electrode-electrolyte assembly 6 is configured similar to the first electrode-electrolyte assembly 4. The second and third electrodes 22 and 23 are in electrically conductive communication with the mesh 8, the first electrode 21 is in electrically conductive communication with the first conduit 10 and the fourth electrode 24 is in electrically conductive communication with the second conduit 12. When the first and second electrode-electrolyte assemblies are assembled with other componentry, the through holes 20, 25 define manifolds that provide fluid communication through the fuel cell system 2. While the first and second electrode-electrolyte assemblies 4, 6 are described as being similar to each other, the present invention is not limited in this regard as the first and second electrode-electrolyte assemblies can be configured differently including but not limited to using different materials for the first and second electrode-electrolyte assemblies and using different fabrication methods.

Referring to FIG. 1, when assembled, the first conduit 10 is in fluid communication with the first catalytic electrode 21 for delivering fuel for example, an aqueous solution of the fuel, to the first catalytic electrode at ambient temperature. Preferably, the temperature of the fuel is from about 15° C. to about 40° C. when delivered and during fuel processing for the formation of hydrogen ions thereby facilitating use of polymer electrolytes. Transient load following capability of the fuel cell system is enabled by processing fuel and operating the fuel cell at ambient temperatures (e.g., 15° C. to about 40° C.) because ramp-up time associated with heating the fuel cell and/or fuel processing system is eliminated. While ambient temperature operation from about 15° C. to about 40° C. is described, the present invention is not limited in this regard as the fuel cell system of the present invention may also be operated at temperatures up to about 60° C. or 80° C.

The second conduit 12 is in fluid communication with the fourth catalytic electrode 24 for delivering an oxidant thereto. Preferably, the first and second conduits 10, 12 are part of respective closed loop systems for delivering fuel to the first electrode 21 and delivering oxidant to the fourth electrode 24, respectively. Reaction products and excess heat are transported away from the fuel cell 2 by the fuel and oxidant flowing through the first and second conduits 10, 12, respectively, in the closed loop systems.

Still referring to FIG. 1, the electricity source 16 has a positive terminal in electrically conductive communication with the first conduit 10 and the first catalytic electrode 21 and a negative terminal in electrically conductive communication with the mesh 8 and the second catalytic electrode 22. The electricity source 16 in the first electrical circuit 14 is sized and polarized to provide the process energy, for example an electrical potential, for an electrochemical reaction to form hydrogen species such as hydrogen ions (e.g., H, H$^+$) and remove poisons such as carbon monoxide (CO) poisons formed on first catalytic electrode 21 at ambient temperatures, for example temperatures of about 15° C. to about 40° C. and/or of about 15° C. to about 60° C. The first electrical circuit 14 is configured for flow of current in the direction shown by the arrows marked 14E and 14F. Electrons and/or negatively charges particles flow in the direction shown by the arrows marked 14E and 14F. However, hydrogen ions are positively charged. Thus, the hydrogen ions convey the electrical current by moving in a direction opposite to that shown by the arrows marked 14E and 14F.

The polarity of the energy storage device 16 causes organic fuels including complex organic fuels to release hydrogen species (H, H$^+$) which first become absorbed and subsequently ionize on the first catalytic electrode 21 to form hydrogen ions without the formation of hydrogen gas. The fuels include, for example, organic fuels having multiple C—C bonds as well as multiple C—H bonds; fuels having an R—H structure (wherein H individualizes the hydrogen atom in the organic molecule likely to undergo the reaction in accordance with Eq. 1); and/or fuels which do not produce hydrogen ions spontaneously in an aqueous solution. The electrochemical reactions taking place at each electrode are illustrated as follows:

Electrode 21

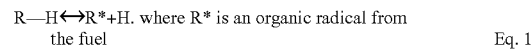

R—H ↔ R*+H. where R* is an organic radical from the fuel      Eq. 1

R—H ↔ R*+H$^+$+$e^-$      Eq. 2.

CO+H$_2$O ↔ CO$_2$+2H      Eq. 3.

CO+H$_2$O ↔ CO$_2$+2H$^+$+2$e^-$      Eq. 4.

Electrodes 22 and 23

H ↔ H$^+$+$e^-$      Eq. 5.

Electrode 24

2H$^+$+½O$_2$+2$e^-$ → H$_2$O      Eq. 6.

Equations 1 and 2 illustrate de-hydrogenation steps in an electrochemical reaction involving the organic fuel. The fuel cell reaction defined by equation 6 illustrates the hydrogen species being consumed. Eq. 6 also illustrates that a concentration gradient, needed to sustain a diffusive process to replenish the hydrogen species consumed, is established.

The hydrogen species produced in the electrochemical reaction are adsorbed on the first electrode 21. The hydrogen diffuses through the first electrode-electrolyte assembly 4 to the third catalytic electrode 23. The fuel cell system 2 illustrated in FIG. 1 can utilize organic fuels directly, without the need for converting them to hydrogen gas prior to being introduced into the cell. When fuels containing multiple carbon-hydrogen bonds are supplied to the first conduit 10, the fuel undergoes successive de-hydrogenization reactions (Eq. 1) and reactions with water until a predetermined amount of CO is formed on the first electrode 21. The accumulated CO de-activates the first electrode 21 because of reactions with the platinum contained therein. Such de-activation can cause the generation of hydrogen species at the first electrode 21 to cease in the absence of the process energy applied via the first electrical circuit 14.

Equation 7 (Eq. 7) illustrates the electrochemical reaction across the first electrode-electrolyte assembly 4. In particular, Eq. 7 illustrates the formation of the hydrogen species (H$^+$), CO$_2$ and electrons, concurrent with the removal of CO poison from the first electrode 21 when the first electrical potential is applied across the first electrode-electrolyte assembly 4, in the presence of water on the first electrode 21.

$$CO+H_2O \rightarrow CO_2+2H^++2e^- \qquad \text{Eq. 7}$$

The process energy for the electrochemical reaction illustrated in Eq. 7 is approximately 0.103 volts, which is consumed in the electrochemical reaction. The fuel cell system 2 is configured to generate an electrical energy output across the second electrode-electrolyte assembly 6. Since, as illustrated in FIG. 1, the second electrical circuit 18 is connected across the second electrode-electrolyte assembly 6 (i.e., with one terminal connected to the electrically conductive mesh 8 and the other terminal is connected to the second conduit 12), the electrons can flow in the second electrical circuit in the direction shown by the arrows marked 18E and 18F. For the second electrode-electrolyte assembly 6, the electrically conductive mesh 8 comprises a terminal of negative polarity and the second conduit 12 comprises a positive terminal. Preferably the first conduit 10 is less positive than the second conduit 12. The electrical energy output across the second electrode-electrolyte assembly 6 is greater than the process energy for the electrochemical reaction defined by Eq. 7.

Figure 1A:
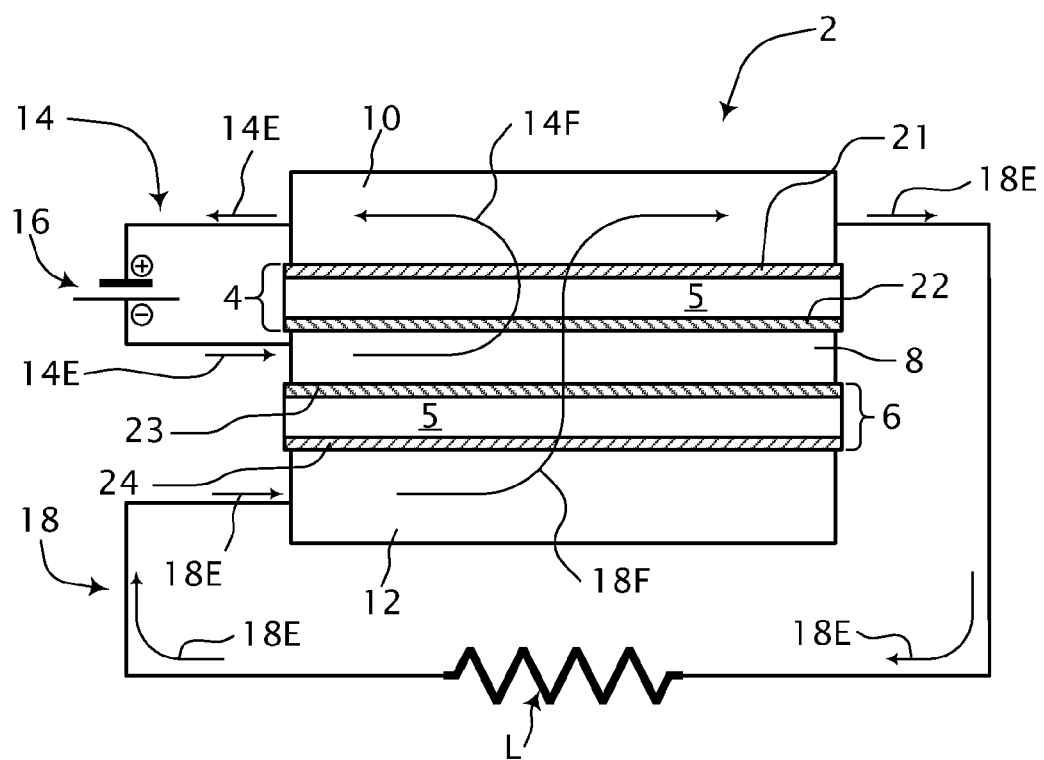
FIG. 1A is a schematic drawing of the fuel cell system of the present invention illustrating electrical connections compatible with bipolar stacking arrangements.

The fuel cell system 2 illustrated in FIG. 1A is similar to the fuel cell system 2 of FIG. 1. For example, the electricity source 16 has a positive terminal in electrically conductive communication with the first conduit 10 and the first catalytic electrode 21 and a negative terminal in electrically conductive communication with the mesh 8 and the second catalytic electrode 22. The electricity source 16 in the first electrical circuit 14 is sized and polarized to provide the process energy for an electrochemical reaction to form hydrogen species such as hydrogen ions (e.g., H, H$^+$). The electricity source is also sized and polarized to remove carbon monoxide (CO) poisons formed on the first catalytic electrode 21. The removal of the carbon monoxide (CO) poisons formed on the first catalytic electrode 21 is conducted while the fuel cell system 2 is at a temperature of about 15° C. to about 40° C. and/or of about 15° C. to about 60° C. The electricity source 16 also provides the electrical potential to permit the hydrogen ions to diffuse through the first electrode-electrolyte assembly 4 to the third catalytic electrode 23.

However, the fuel cell system 2 differs from that illustrated in FIG. 1. While one side of the second electrical circuit 18 of FIG. 1A is connected to the fourth electrode 24, the other side of the second electrical circuit is connected to the first electrode 21, for example, via the first conduit 10. Therefore the second electrical circuit 18 of FIG. 1A is configured for electrical current flow in the direction shown by the arrows marked 18E and 18F. In particular, in the fuel cell system of FIG. 1A, the electrical current flows in the direction shown by the arrow 18F through first and second electrode-electrolyte assemblies 4 and 6, respectively. The fuel cell system 2 of FIG. 1A is configured to generate an electrical energy output at temperatures of about 15° C. to about 40° C. and/or of about 15° C. to about 60° C. The fuel cell system 2 of FIG. 1A is suitable for use in fuel cell stacks which incorporate bipolar plates between adjacent fuel cell systems. The second electrical circuit 18 illustrated in FIG. 1A, is configured to convey electrical current generated in the fuel cell system 2 to a load, for example a resistor.

During operation of the fuel cell of FIG. 1A, fuel is supplied to electrode 21 and the oxidant, such as air, is supplied to electrode 24. The overall fuel cell reaction is shown in Equation 8 (Eq. 8).

$$R\text{---}H+O_2 \rightarrow H_2O+CO_2 \qquad \text{Eq. 8}$$

Because the fuel does not have to diffuse through an electrode-electrolyte layer to reach the reaction site, the fuel cell system illustrated in FIG. 1A is capable of better performance than the fuel cell system illustrated in FIG. 1, at the same operating conditions and with the same fuel. The removal of CO from the electrode surface proceeds in the same manner as described above for FIG. 1.

The oxidation of the fuel takes place at electrode 21 which results in the oxidation of the CO in accordance with Eq. 7. However, the cell structure represented schematically in FIG. 1A is of a bipolar configuration to allow scaling-up to increase overall system output. The direction of the bias current flow through the first electrical circuit 14 is illustrated by arrows marked 14E and 14F and the direction of current flow through the second electrical circuit 18 is illustrated by arrows marked 18E and 18F. The second electrical circuit 18 includes an electrically conductive path through the first and second electrode-electrolyte assemblies 4 and 6, respectively. When the bias current changes, the total current across the first electrode-electrolyte assembly 4 also changes. Therefore, the electrical potential across the load L changes because electrode-electrolyte assembly 4 is also a part of the load circuit. In this configuration, the second conduit 12 is the most positive; the first conduit 10 is negative but it is made less negative than the mesh 8 by the electrical potential applied by the energy storage device 16 in the first electrical circuit 14.

Use of the fuel cell configuration of FIG. 1A yields an unexpected experimental result of increased system performance compared to fuel cell systems having the configuration of FIG. 1. For example, test data demonstrated a stable voltage of about 0.48 volts to about 0.61 volts and a stable current density in the second electrical circuit 18 of about 0.60 amperes per cm$^2$, with a bias current density in the first electrical circuit 14 of less than 10% of the current density in the second electrical circuit 18, for about 5400 seconds to about 8100 seconds. While the fuel cell system 2 of FIG. 1A, is described as having a stable voltage and current density for about 5400 seconds to about 8100 seconds, the present invention is not limited in this regard in that such stable operation can be achieved continuously as long as the fuel and oxidant are supplied to the fuel cell system and the process energy is supplied for removing the poisons from the first electrode 21.

The configuration illustrated in FIG. 1A uses substantially the entire contact surface area of the first and second electrode-electrolyte assemblies 4 and 6 to convey the load current 18F. In contrast, in the fuel cell system 2 of FIG. 1, only the second electrode-electrolyte assembly conveys the load current 18F. Thus the mesh 8 of FIG. 1A conveys less current than the mesh 8 of FIG. 1. As a result, the fuel cell system 2 of FIG. 1A allows for the use of a mesh 8 having a thickness of about 0.005 inches, compared to the mesh 8 of FIG. 1 which has a thickness of about 0.020 inches. Use of the mesh 8 having a thickness of about 0.005 inches increases the amount of engagement between the second and third electrodes 22 and 23, respectively and the ability to cause such engagement, compared to a mesh having a thickness of 0.020 inches. Increasing the amount of engagement between the second and third electrodes 22 and 23 causes improved fuel cell system performance.

Figure 3:
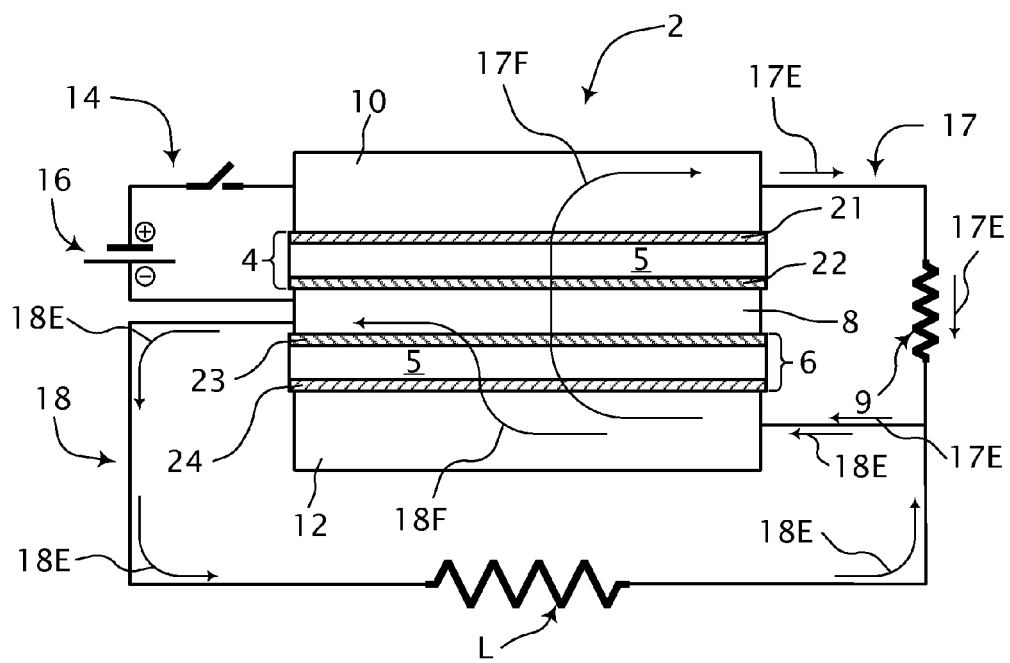
FIG. 3 is a schematic drawing of the present invention illustrating the process energy being provided by the energy output of the fuel cell.

Referring to FIG. 3, the energy storage device 16 is shown, after start-up of the fuel cell system 2, disconnected from the first electrical circuit 14 and a portion of the energy output across the second electrode-electrolyte assembly 6 is used to provide the process energy for the electrochemical reaction. The remainder of the electrical output is shown being consumed by a useful electrical load L connected in the second electrical circuit 18. The electrical energy output across the second electrode-electrolyte assembly 6 is greater than the process energy used in the electrochemical reaction. The ballast resistor 9 has a resistance less than or equal to that of the electrical load L.

FIG. 3 illustrates a ballast resistor 9 connected in a third electrical circuit 17. The ballast resistor 9 has one terminal in electrically conductive communication with the first conduit 10 which carries a negative charge. The ballast resistor 9 has another terminal in electrically conductive communication with the second conduit 12 which carries a positive charge. The third electrical circuit 17 provides and regulates current flow from the second electrical circuit 18 to provide the process energy for the electrochemical reaction to form hydrogen species. The third electrical circuit 17 diverts at least a portion of the current flow from the second electrical circuit 18. Current flowing through the second electrical circuit 18 is greater than current flowing through the third electrical circuit 17 for providing the process energy. The ballast resistor 9 regulates the flow of the electrical current through the third electrical circuit 17 such that the first conduit 10 is at a less positive electrical potential than that at the second conduit 12 but at a more positive electrical potential than the mesh 8. As shown in FIG. 3, current flows through the third electrical circuit 17 in the direction indicated by the arrows marked 17E and 17F and is conveyed by both the first and second electrode-electrolyte assemblies 4 and 6, respectively. Thus, the bias resistor 9 enables current to flow across the electrode-electrolyte assembly 4 in the same direction as that shown by arrow 14F in FIG. 1A. In addition, as shown in FIG. 3, current flows through the second electrode-electrolyte assembly 6 in the direction indicated by the arrow marked 18F and through the remainder of the second electrical circuit 18 in the direction indicated by the arrow marked 18E. Although a ballast resistor 9 is illustrated for regulating current flow in the third electrical circuit 17, the present invention is not limited in this regard as other devices can also be used including, but not limited to, a semiconductor device and electronic current controls for a finer match between the fuel processing current and the external load.

Still referring to FIG. 3, the ballast resistor 9 and electrical load L, both provide sources for consumption of electrical energy produced in the electrochemical reaction. The current through the third electrical circuit 17 can be increased up to but less than the current through the second electrical circuit 18.

Figure 4:
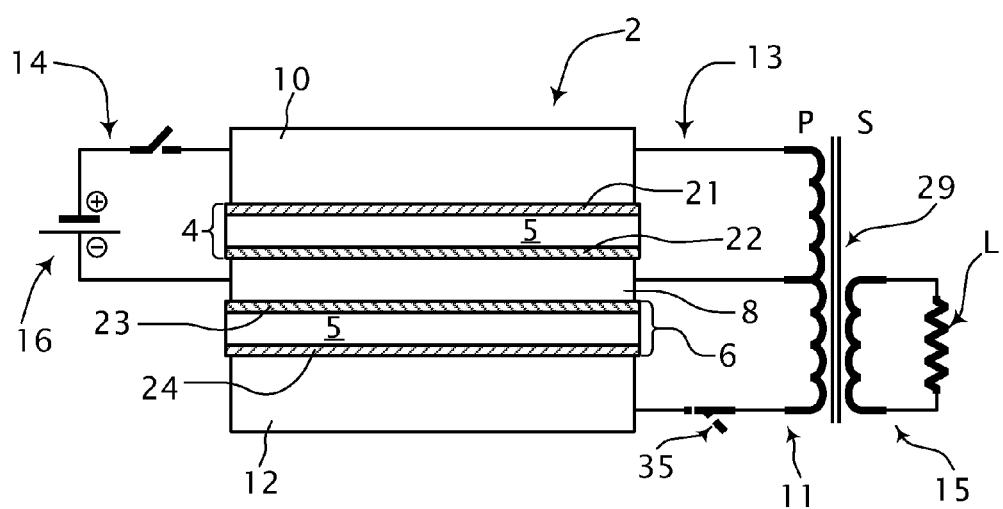
FIG. 4 is a schematic drawing of the fuel cell of FIG. 3 including an inductive device for providing the process energy.

Referring to FIG. 4, the energy storage device 16 is shown, after start-up of the fuel cell system 2, disconnected from the first electrical circuit 14. During operation, the fuel cell system is electrically connected to an inductive device 29 having a primary side P and a secondary side S. The primary side (P) comprises primary circuit 11 and a branch circuit 13. The primary circuit 11 includes a switching device 35 for the repeated opening and closing thereof to charge the inductive device 29. The primary circuit 11 is electrically connected across the second electrode-electrolyte assembly 6 thereby terminating at the second conduit 12 and the mesh 8. The branch circuit 13 has a terminal in electrically conductive communication with the first conduit 10 and another terminal in electrically conductive communication with the mesh 8. The secondary side (S) comprises a secondary side circuit 15 and a load L. The primary, branch and secondary circuits 11, 13, and 15, respectively, are wired to produce the most negative polarity at the mesh 8, the second most negative polarity at the conduit 10 such that the conduit appears positive with respect to mesh 8 and the most positive at the second conduit 12 upon the repeated opening and closing of the switching device 35.

Referring to FIG. 4, the primary circuit 11 conveys electrical current from the electrical energy output across the second electrode-electrolyte assembly 6 by flowing current to the branch circuit 13 thereby providing the process energy of the electrochemical reaction. The remainder of the electrical energy output across the second electrode-electrolyte assembly 6 is consumed by charging the inductive device 29 for consumption by the useful electrical load L connected in the secondary circuit 15. Regularly opening and closing the switching device 35 generates a transient which causes an induced current in the secondary circuit 15. The transient is highest during the period when the switch 35 is closed. Current flowing in the secondary circuit 15 has a wave form consisting of a series of DC pulses of an amplified potential relative to an electrical potential across the first conduit 10 and the second conduit 12. Although a portion of the electrical energy output across the second electrode-electrolyte assembly 6 is shown connected to the branch circuit 13 and the remainder charging an inductive device 29, the present invention is not limited in this regard as other configurations are also within the scope of the present invention, including but not limited to consuming substantially the entire energy output for charging the inductive device to generate electrical current on the secondary side for the process energy and for consumption by a useful load.

Figure 4A:
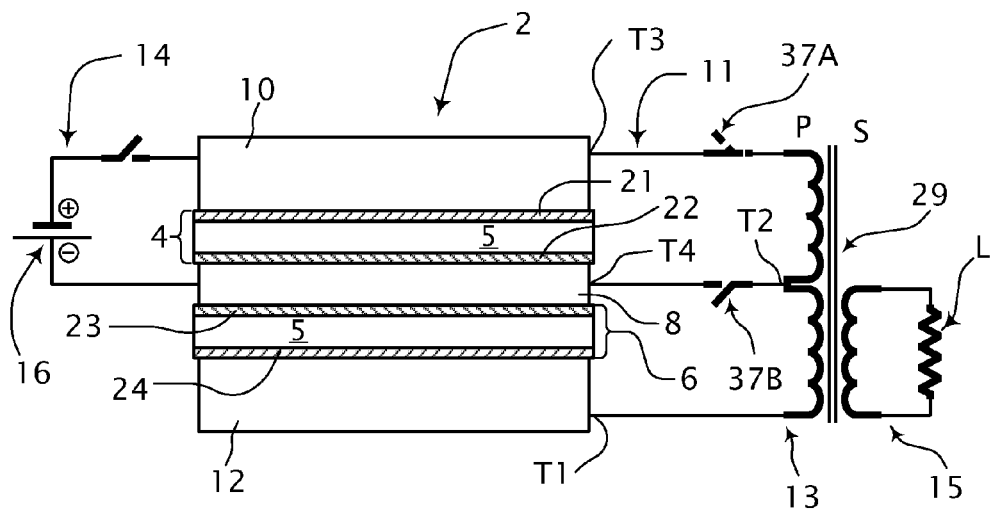
FIG. 4A is a schematic drawing of the fuel cell of FIG. 3 including an inductive device for providing the process energy and having multiple switches aligned to activate a primary circuit.
Figure 4B:
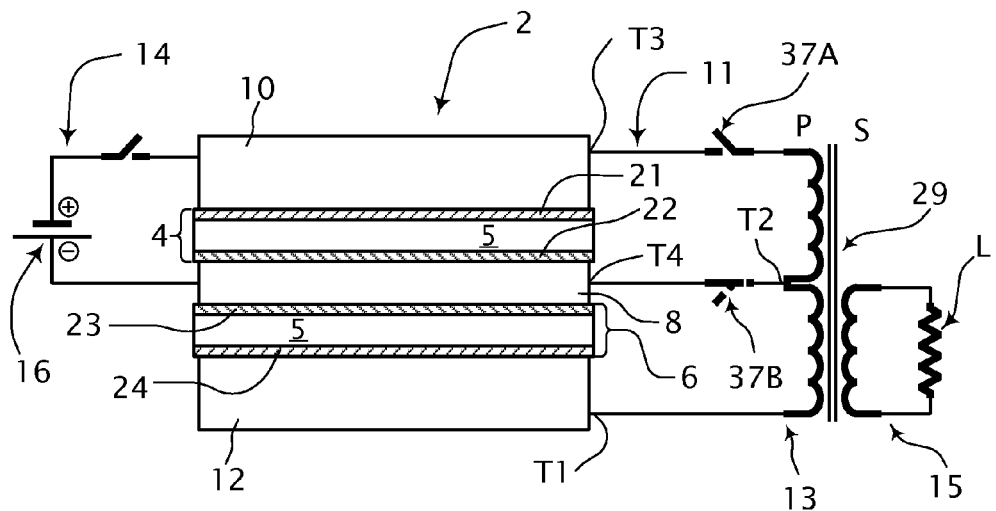
FIG. 4B is a schematic drawing of the fuel cell of FIG. 3 including an inductive device for providing the process energy and having multiple switches aligned to activate a branch circuit.
Figure 5:
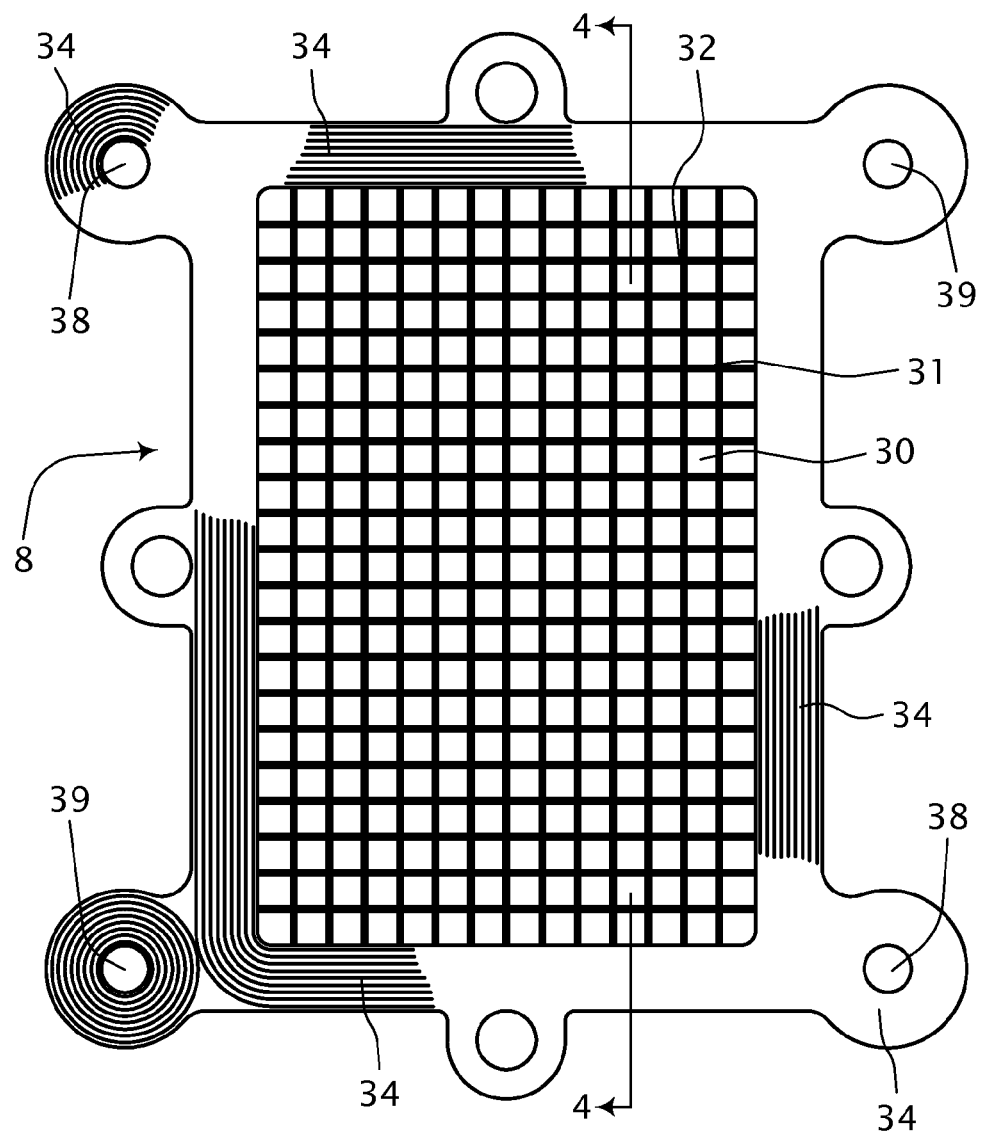
FIG. 5 is a top view of the mesh.
Figure 6:
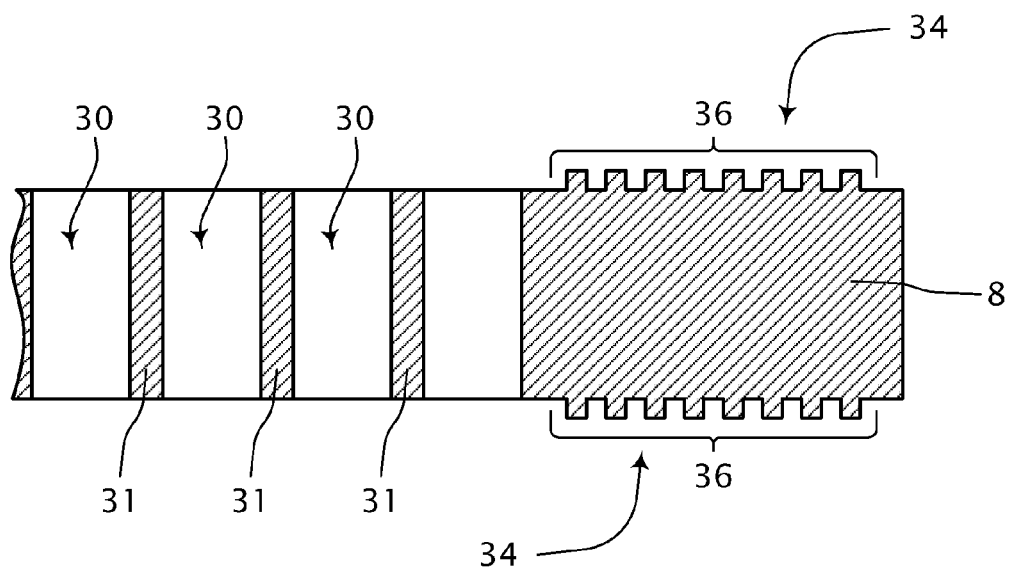
FIG. 6 is a cross sectional view of the mesh of FIG. 5.
Figure 7:
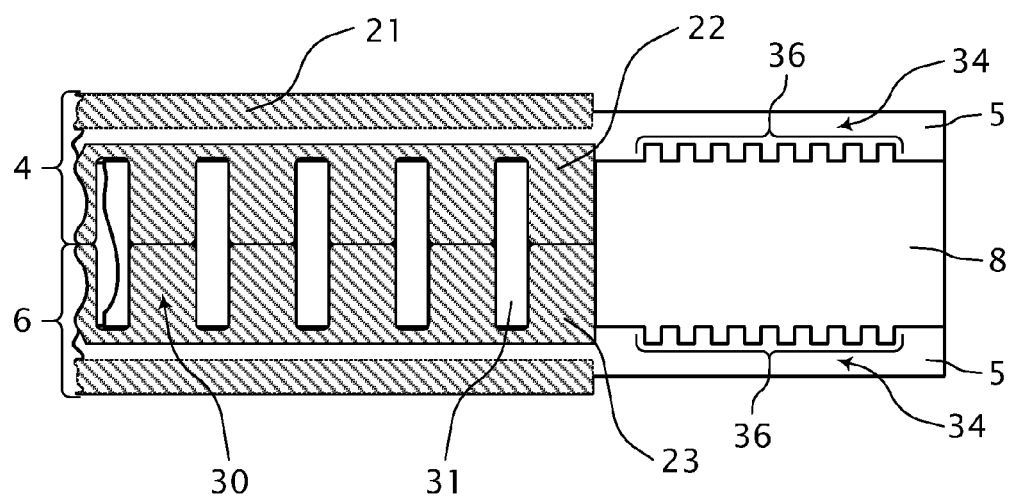
FIG. 7 is a cross sectional view of a portion of the mesh of FIG. 5 positioned between the first and second electrode-electrolyte assemblies.

The fuel cell systems 2 of FIGS. 4A and 4B are similar to that described above for FIG. 4, however in the fuel cell systems of FIGS. 4A and 4B do not include the switching device 35 but instead incorporate two switching devices 37A and 37B, interlocked with one another, as described below. The primary circuit 11 includes the switching device 37A positioned between terminal T2 and terminal T3; and the branch circuit 13 includes the switching device 37B positioned between the terminal T2 and terminal T4. The primary circuit 11 provides electrical communication across the first and second electrode-electrolyte assemblies 4 and 6, from terminal T1 to terminal T2 to terminal T3, when the switching device 37A is closed and the switching device 37B is open (FIG. 4A). The branch circuit 13 provides electrical communication across the second electrode-electrolyte assembly 6, from terminal T1 to terminal T2 to terminal T4, when the switching device 37B is closed and the switching device 37A is open (FIG. 4B). The switching devices 37A and 37B are in communication with an interlock device (not shown) which is configured to ensure that the switching devices 37A and 37B are never opened at the same time or closed at the same time. The interlock device includes a timer which is configured to provide a delay time for operation of the switching devices 37A and 37B to ensure there is no period of time when both of the switching devices 37A and 37B are simultaneously open or closed.

During operation of the fuel cell system 2 as illustrated in the configuration of FIG. 4A, electrical current generated across the first and second electrode-electrolyte assemblies 4 and 6 flows through the primary circuit 11. In addition, during operation of the fuel cell system 2 as illustrated in the configuration of FIG. 4B, electrical current generated across the second electrode-electrolyte assembly 6 flows through the branch circuit 13. Toggling of current flow between the primary circuit 11 and the branch circuit 13 has utility in that it provides the transients needed to activate the inductor 29. The fuel cell system 2 illustrated in FIGS. 4A and 4B has the same current loops as those illustrated in FIG. 3 but are offset in time such as to provide the transient needed to energize the inductor 29.

Referring to FIGS. 1-7, the electrically conductive mesh 8 comprises an electrically conductive material having a plurality of apertures 30 extending through a first active area 32. The apertures 30 are defined by a plurality of walls 31 spaced apart from one another such that, in the preferred embodiment, when the mesh is positioned between the first and second electrode-electrolyte assemblies 4, 6, portions of the second and third electrodes 22, 23 deform into the apertures 30 and engage each other. During operation of the fuel cell assembly 2, hydrogen species such as hydrogen ions diffuse from the first electrode-electrolyte assembly 4 to the second electrode-electrolyte assembly 6 through the portions of the second and third electrodes 22, 23 which engage each other. Preferably, the mesh 8 has a greater electrical conductivity than that of at least the electrodes 22, 23 for distributing electrical current throughout the first active area 32 and portions of the second and third electrodes engaged therewith. The mesh 8 provides electrical terminals for at least the first electrical circuit 14 and the second electrical circuit 18.

One side of the mesh 8 has a sealing area 34 substantially along the periphery thereof. The sealing area 34 comprises an interference pattern 36 (e.g., grooves) that forms a positive interlocking seal with the soft polymer material of the electrode-electrolyte assembly. The interference pattern 36 used for illustration includes a plurality of parallel ridges that form grooves. An opposing side of the mesh 8 has a similar sealing area and interference pattern. When the mesh 8 is positioned between the first and second electrode-electrolyte assemblies the ridges of the sealing area 34 are pressed onto the material of the electrode-electrolyte assemblies and can deform to ensure fluid containment in their respective designated cavities.

Referring back to FIG. 5, the mesh 8 also includes through holes 38, 39. When the mesh 8 is assembled with other componentry, the through holes 38, 39 define manifolds that provide fluid communication through the fuel cell system 2. The sealing area 34 also extends substantially around the perimeter of the through holes 38, 39.

Figure 8:
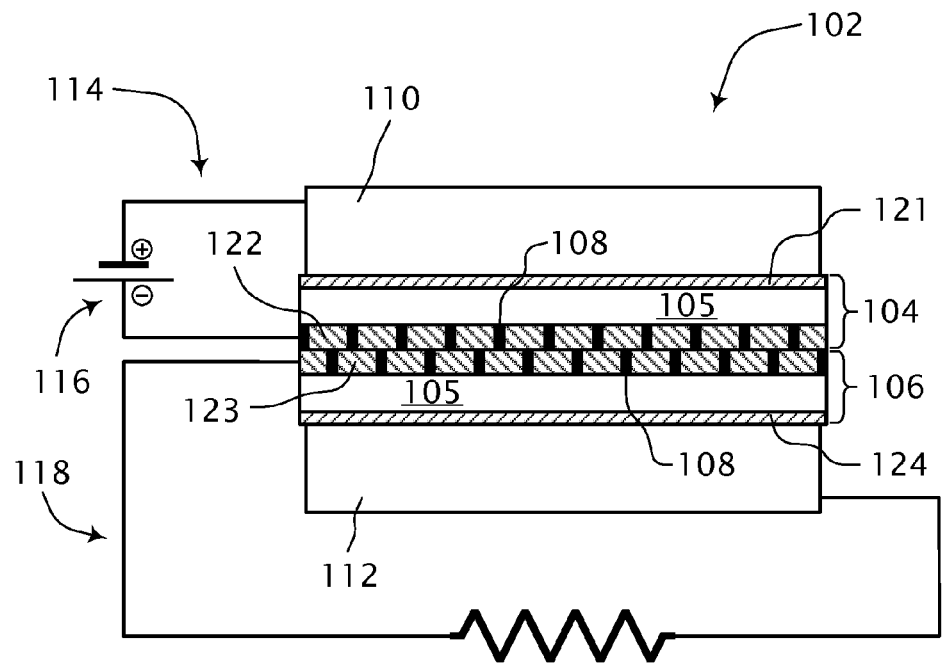
FIG. 8 is a cross sectional view of the fuel cell system having meshes embedded in the electrodes.

Referring now to FIG. 8, the fuel cell system shown generally at 102 is similar to the fuel cell system 2 illustrated in FIGS. 1-7. Accordingly, like elements are assigned like numerals preceded by the numeral 1 or 10. The fuel cell system 102 includes a first electrode-electrolyte assembly 104 and a second electrode-electrolyte assembly 106. The first electrode-electrolyte assembly 104 includes an electrolyte membrane 105, preferably formed of an ion exchanging polymer, the electrolyte membrane having a first electrode 121 and a second electrode 122, preferably catalytic electrodes hot pressed onto opposing surfaces thereof. The second electrode 122 includes an electrically conductive mesh 108 embedded therein. Similarly, the second electrode-electrolyte assembly 104 includes an electrolyte membrane 105, preferably formed of an ion exchanging polymer, the electrolyte membrane having a third electrode 123 and a fourth electrode 124, preferably catalytic electrodes hot pressed onto opposing surfaces thereof. The third electrode 123 includes an electrically conductive mesh 108 embedded therein. A first conduit 110 is in fluid communication with first electrode 121 and a second conduit 112 is in fluid communication with the fourth electrode 124. The first and second electrode-electrolyte assemblies 104, 106, and the first and second conduits 110, 112 are in electrically conductive communication with one another. The fuel cell system 102 includes a first electrical circuit 114 including an energy storage device 116 for providing a first electrical potential across the first electrode-electrolyte assembly 104. In addition, a second electrical circuit 118 is connected across the second electrode-electrolyte assembly 106 for conveying electrical current from an energy output in the form of a second electrical potential generated thereacross.

The meshes 108 are similar to the mesh 8 described above. In particular, preferably, the meshes 108 have a greater electrical conductivity than that of at least the electrodes 122, 123 for distributing electrical current throughout portions of the second and third electrodes 122, 123. The meshes 108 provide electrical terminals at least for the first electrical circuit 114 and the second electrical circuit 118. When assembled, the second and third electrodes 122, 123 are positioned adjacent to and engaged with one another.

Figure 8A:
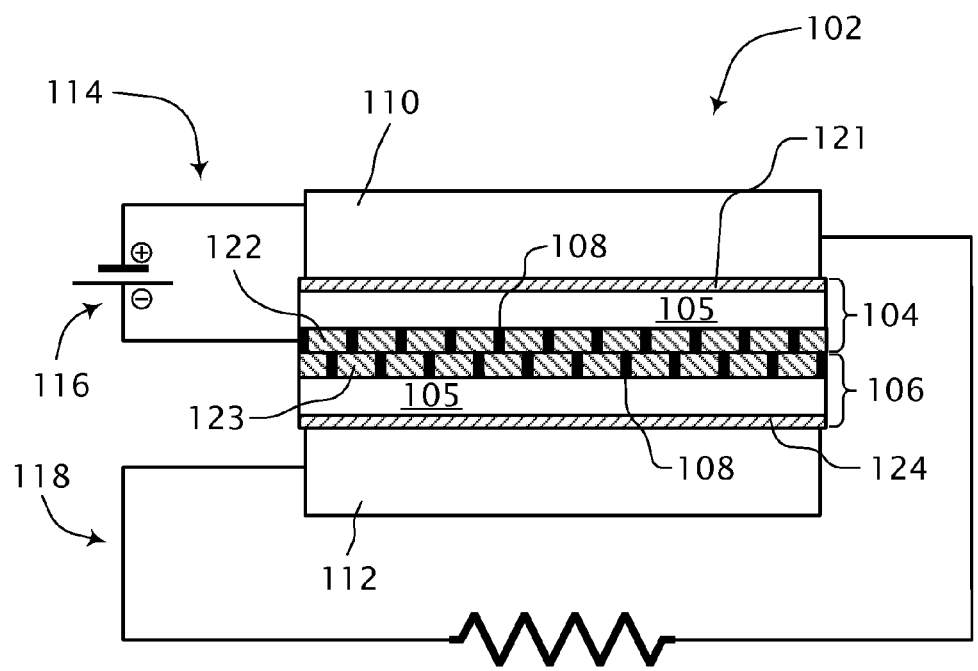
FIG. 8A is a cross sectional view of the fuel cell system compatible with a bipolar construction and having meshes embedded in the electrodes.

Referring to FIG. 8A, the fuel cell system 102 is configured similar to that illustrated in FIG. 8 above, however the load circuit 118 is connected across the first and second conduits 110 and 112 (i.e., across the first and second electrode-electrolyte assemblies 104, 106, including the electrically conductive meshes 108 embedded therein). Connecting the second electrical circuit 118 across the first and second conduits 110 and 112 has utility in that such a configuration results in the unexpected benefits as those described above for the fuel cell system 2 of FIG. 1A.

Figure 9:
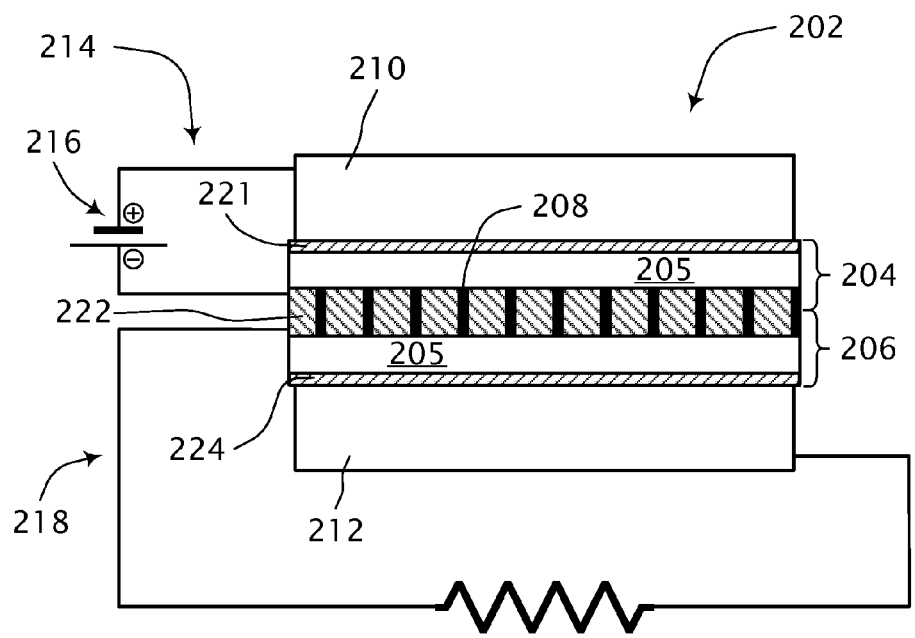
FIG. 9 is a cross sectional view of the fuel cell system including a common electrode having a mesh embedded therein.

Referring now to FIG. 9, the fuel cell system is shown generally at 202. The fuel cell system 202 includes a first electrode-electrolyte assembly 204 and a second electrode-electrolyte assembly 206. The first electrode-electrolyte assembly 204 includes an electrolyte membrane 205, preferably formed of an ion exchanging polymer, the electrolyte membrane having a first electrode 221, preferably a catalytic electrode hot pressed onto one surface thereof. The fuel cell system includes second and third electrodes combined into one common electrode 222 having an electrically conductive mesh 208 embedded therein. The second electrode-electrolyte assembly 204 includes an electrolyte membrane 205, preferably formed of an ion exchanging polymer, the electrolyte membrane having a fourth electrode 224, preferably a catalytic electrode hot pressed onto opposing surfaces thereof. The common electrode 222 is disposed between membrane surfaces 205 of the first and second electrode-electrolyte assemblies. A first conduit 210 is in fluid communication with first electrode 221 and a second conduit 212 is in fluid communication with the fourth electrode 224. The first and second electrode-electrolyte assemblies 204, 206, and the first and second conduits 210, 212 are in electrically conductive communication with one another. The fuel cell system 202 includes a first electrical circuit 214 including an energy storage device 216 for providing a first electrical potential across the first electrode-electrolyte assembly 204. In addition, a second electrical circuit 218 is connected across the second electrode-electrolyte assembly 206 for conveying electrical current from an energy output in the form of a second electrical potential generated thereacross.

The mesh 208 is similar to the mesh 8 and 108 described above. In particular, the mesh 208 has a greater electrical conductivity than that of at least the common electrode 222 for distributing electrical current throughout portions thereof. The mesh 208 provides electrical terminals at least for the first electrical circuit 214 and the second electrical circuit 218.

Figure 9A:
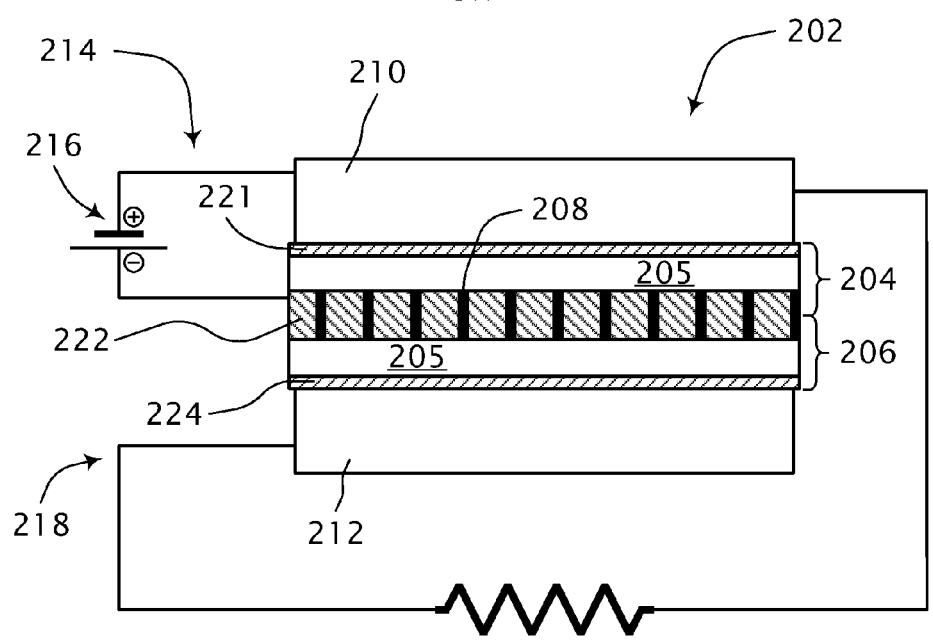
FIG. 9A is a cross sectional view of the fuel cell system compatible with a bipolar construction including one electrode having a mesh embedded therein.

Referring to FIG. 9A, the fuel cell system 202 is configured similar to that illustrated in FIG. 9 above, however the load circuit 218 is connected across the first and second conduits 210 and 212 (i.e., across the first and second electrode-electrolyte assemblies 204, 206, including the electrically conductive mesh 208 embedded therein). Connecting the second electrical circuit 218 cross the first and second conduits 210 and 212 has utility in that such a configuration results in the unexpected benefits as those described above for the fuel cell system 2 of FIG. 1A.

Referring now to the exemplary embodiment in FIG. 10, an electrode-side of the conduit 10 includes a second active area 51 defined by a plurality of passages 40, through which fluid communication can be maintained between the adjacently positioned first catalytic electrode. Preferably, at least portions of the first conduit 10 have a greater electrical conductivity than that of the catalytic electrodes for distributing electrical current throughout the second active area 51 and portions of the first catalytic electrode engaged therewith. The first conduit 10 provides an electrical terminal for the first electrical circuit 14. A second conduit 12 provides an electrical terminal for the second electrical circuit 18. While the first and second conduits 10 and 12 are described as providing electrical terminals, the present invention is not limited in this regard, as separate electrical terminals in electrically conductive communication with the conduits are also within the scope of the present invention.

The electrode-side of the first conduit 10 has a sealing area 44 substantially along the periphery thereof. The sealing area 44 has an interference pattern (e.g., grooves) that forms a positive interlocking seal with the soft polymer material of the electrode/electrolyte assembly, similar to that described above for the mesh 8. The electrode-side also includes through holes 48, 49. When the first conduit 10 is assembled with other componentry, the through holes 48, 49 define manifolds that provide fluid communication through the fuel cell system 2. The sealing area 44 also extends substantially around the through holes 48, 49.

Referring now to FIGS. 10 and 11 the first conduit 10 includes a flow distribution inlet 50 and a flow distribution structure 52. The conduit also includes a flow distribution outlet 54 and a flow distribution receiving structure 56. The flow distribution inlet 50 is in fluid communication with the through hole 48 and provides process fluid to the flow distribution structure 52. The flow distribution structure 52 distributes the process fluid to the second active area 51, generally in the direction of the arrow 57, which allows the fluid to be dispensed through the second active area 51 of the first conduit 10 over the surface area of the electrode-electrolyte assembly when assembled. Excess fluid in the second active area 51 is received in the flow distribution receiving structure 56, which channels the process fluid, in the general direction of the arrow 59, to the flow distribution outlet 54 and to the through hole 48 that defines part of the outlet manifold of the cell. The second conduit 12 is similar in configuration to and has materials of manufacture similar to that of the first conduit 10.

Figure 12:
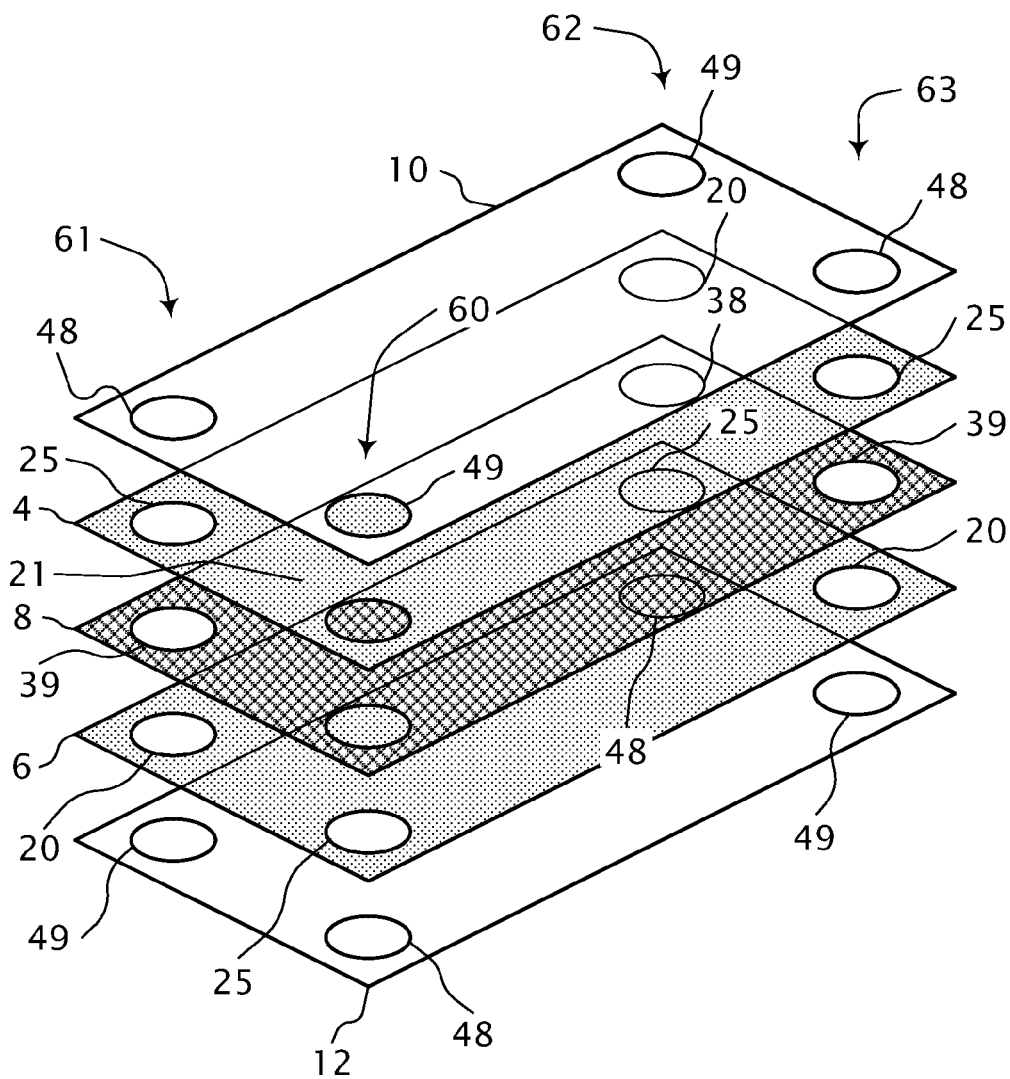
FIG. 12 is a schematic drawing of an exploded view of an assembled fuel cell system.

Referring now to FIG. 12, the assembled fuel cell system 2, comprises the first electrode-electrolyte assembly 4, the second electrode-electrolyte assembly 6 and the electrically conductive mesh 8 disposed therebetween and in sealing engagement therewith. The first conduit 10 is in fluid communication with one side of the first electrode-electrolyte assembly 4 and the second conduit 12 is in fluid communication with one side of the second electrode-electrolyte assembly 6. The fuel cell system 2 is assembled such that through holes 49, 20, 38, and 48 of each respective component are aligned to define inlet fluid manifolds 60; through holes 48, 25, 39, 20 and 49 of each respective component are aligned to define inlet fluid manifolds 61; through holes 49, 20, 38, 25 and 48 of each respective component are aligned to define outlet fluid manifold 62; and through holes 48, 25, 39, 20 and 49 of each respective component are aligned to define outlet fluid manifold 63.

Figure 13:
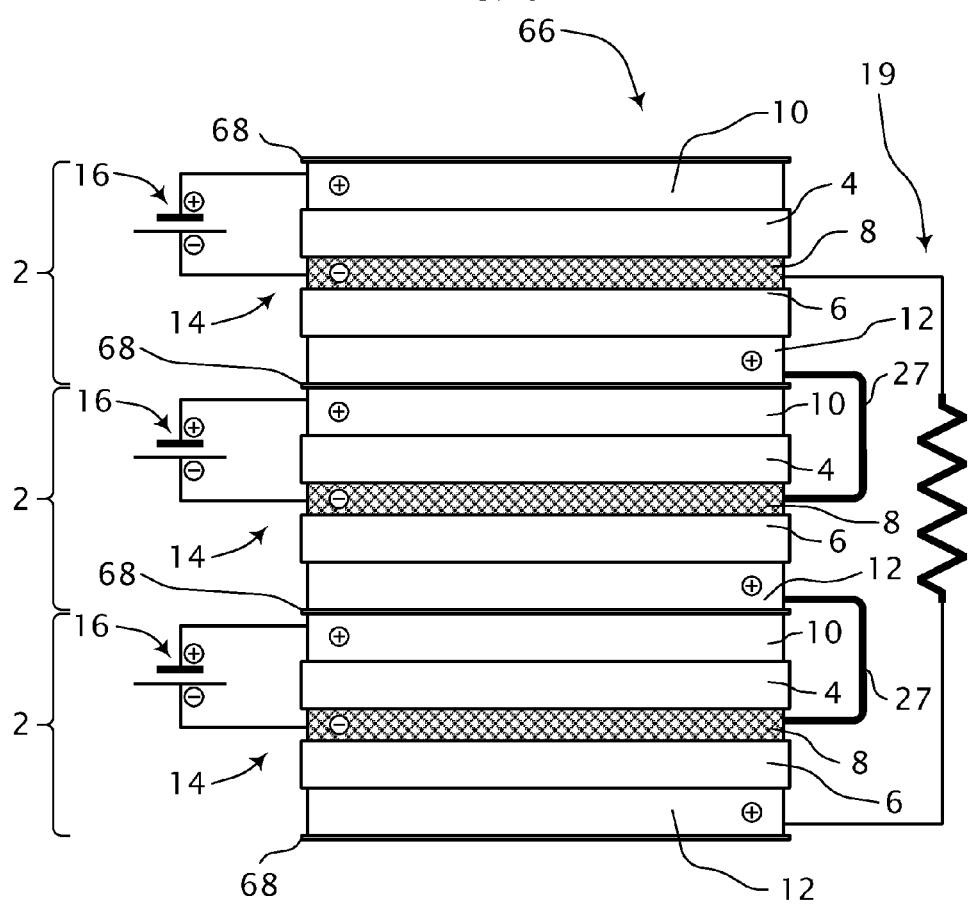
FIG. 13 is a schematic drawing of a plurality of fuel cell systems of FIG. 1 arranged in a stack.

Referring to FIG. 13, it is sometimes advantageous to assemble a plurality of fuel cell systems 2 in a stack 66. The stack 66 configuration illustrates the individual fuel cell systems 2 connected electrically in series using conductors 27, and the flow of fuel and oxidant through the respective conduits is managed in a parallel flow configuration wherein dielectric separators 68 are disposed between adjacent fuel cell systems and upon terminating ends thereof. Each of the fuel cell systems 2 comprises the first electrical circuit 14 including the energy storage device 16 for providing a first electrical potential across the first electrode-electrolyte assembly 4. In addition, a circuit 19 is connected between the mesh 8 of a fuel cell system 2 on one end of the stack 66, and the second conduit 12 of a fuel cell system on the opposing end of the stack for consuming energy output in the form of a second electrical potential generated thereacross. Electrically conductive communication is provided between the second conduit 12 of one fuel cell system 2 and the mesh 8 of an adjacent fuel cell system by conductors 27. In particular, the fuel cell systems 2 are shown connected to each other in an electrical series circuit. The stack 66 is configured to operate similar to that described above for the single cell fuel cell systems 2 of FIG. 1. Although individual fuel cell systems 2 are shown connected electrically in series using conductors 27, and the flow of fuel and oxidant through the respective conduits is managed in a parallel flow configuration, it the present invention is not limited in this regard as other fuel cell system stacking configurations are also within the scope of the present invention.

FIG. 13A illustrates a fuel cell stack similar to the fuel cell stack of FIG. 13. Accordingly, like elements are given like reference numbers, preceded by the number 4 or 40. The fuel cell stack 466 includes a plurality of fuel cell systems 402 in a bipolar configuration. For example, three fuel cell systems 402 are connected electrically in series using electrical conductors 468, such as bipolar plates. In the fuel cell stack 466 the flow of fuel and oxidant through the first and second conduits 410, 412, respectively is managed in a parallel flow configuration wherein the electrical conductors 468 are disposed between adjacent fuel cell systems 402 and upon terminating ends of the stack. Each of the fuel cell systems 402 comprises a first electrical circuit 414 including an energy storage device 416 for providing a first electrical potential across the first electrode-electrolyte assembly 404. In addition, a circuit 419 is connected between the first conduit 410 of a fuel cell system 402 on one end of the stack 466, and the second conduit 412 of a fuel cell system on the opposing end of the stack for consuming energy output in the form of a second electrical potential generated thereacross. In particular, the fuel cell systems 402 are shown connected to each other in an electrical series circuit. The fuel cell stack 466 is configured to operate similar to that described above for the single cell fuel cell systems 2 of FIG. 1A.

Figure 14:
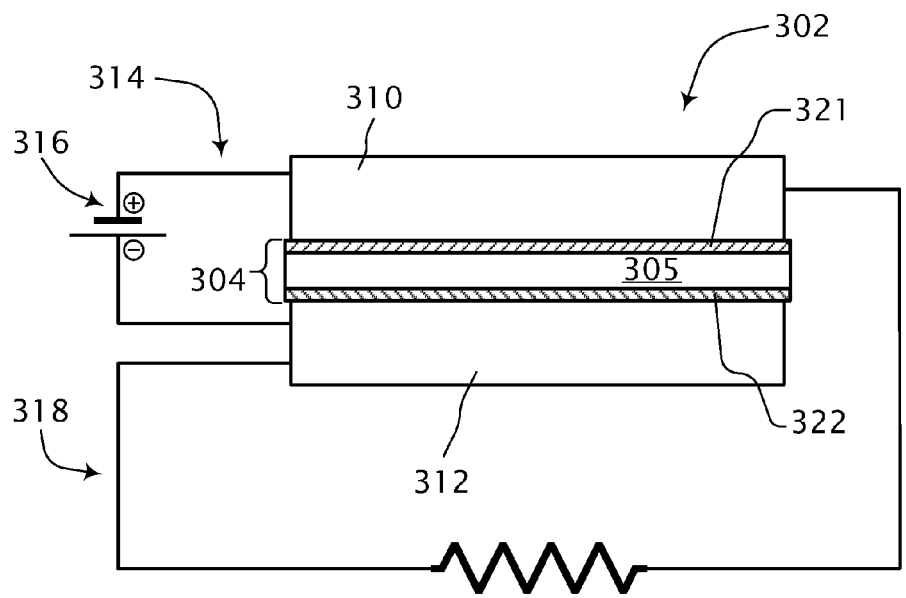
FIG. 14 is a schematic drawing of a fuel cell system having one electrode-electrolyte assembly.

Referring to FIG. 14, a single cell fuel cell system 302 comprises an electrolyte assembly 304 which operates alternately as fuel processing and fuel cell device. The electrode-electrolyte assembly 304 is disposed between a first conduit 310 and a second conduit 312. The electrode-electrolyte assembly 304 includes a first catalytic electrode 321 coupled to one side of the electrode-electrolyte assembly and a second catalytic electrode 322 coupled to a generally opposing side of the electrode-electrolyte assembly. The electrode-electrolyte assembly 304 includes an electrolyte membrane 305, preferably formed of an ion exchanging polymer similar to that described above for the electrode-electrolyte assembly 4.

The first conduit 310 is in fluid communication with the first catalytic electrode 321 for delivering fuel thereto at ambient temperature. The second conduit 312 is in fluid communication with the second catalytic electrode for delivering an oxidant thereto. The fuel cell system 302 includes a first electrical circuit 314 including an energy storage device 316 for providing a first electrical potential across the electrode-electrolyte assembly 304. In addition, a second electrical circuit 318 is connected across the electrode-electrolyte assembly 304 for consuming energy output in the form of a second electrical potential generated thereacross. A plurality of the fuel cell systems 302 may be connected individually in an electrical series circuit or arranged in a stack with suitable fluid distribution hardware. While the first electrical circuit 314 is shown to include an energy storage device 316, the present invention is not limited in this regard as a battery, capacitor or a combination of a plurality thereof can be used.

The electrode-electrolyte assembly 304 and the conduits 310, 312 have though holes aligned to form manifolds. The conduits 310, 312 have sealing areas to provide sealing engagement with the electrode-electrolyte assembly; and flow distribution inlets, flow distribution structures, flow distribution outlets and a flow distribution receiving structures. In addition, the fuel cell system 302 is similarly configured to the fuel cell system 2 for processing aqueous solutions of complex organic fuels at ambient temperature.

Referring to FIG. 14, the energy storage device 316 has a positive terminal in temporary electrically conductive communication with the first conduit 310 and first catalytic electrode 321 and a negative terminal in intermittent electrically conductive communication with the second conduit 312 and the second catalytic electrode 322. The conduit 310 is generally used for supplying an organic fuel to the catalytic electrode 321 and the conduit 312 is generally used for supplying an oxidant to the catalytic electrode 322. The polarity of the energy storage device 316 in the first electrical circuit 314 thus provides the process energy for an electrochemical reaction to remove carbon monoxide (CO) poisons formed on first catalytic electrode 321 and form hydrogen species. The hydrogen diffuses through the electrode-electrolyte assembly 304. A second electrical circuit 318 is intermittently connected across the electrode-electrolyte assembly for consuming energy output in the form of the second electrical potential generated therefrom.

Figure 15:
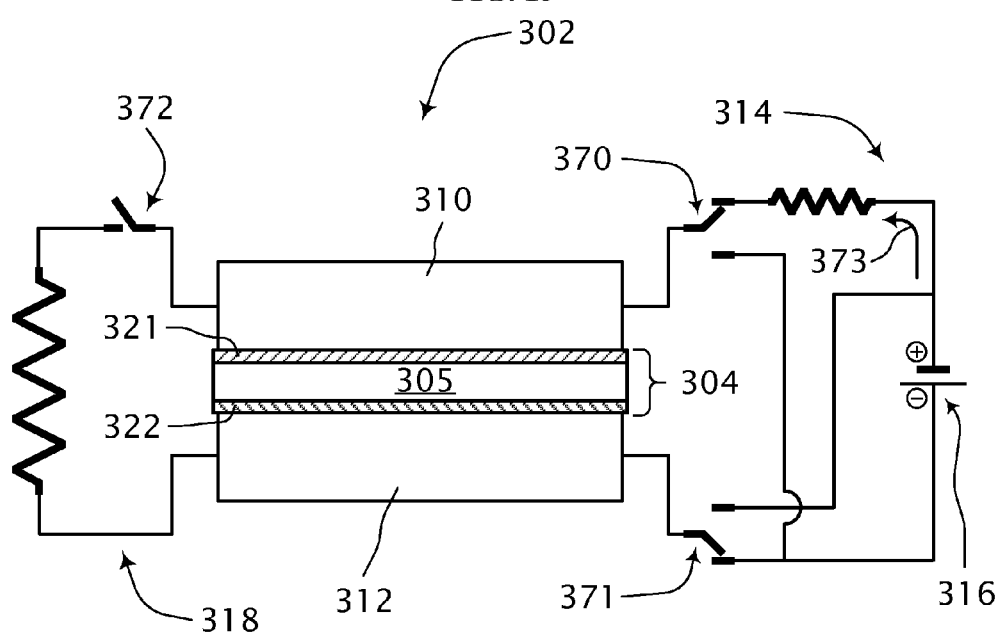
FIG. 15 is a schematic drawing of the fuel cell system of FIG. 14 shown with the second electrical circuit de-energized.
Figure 16:
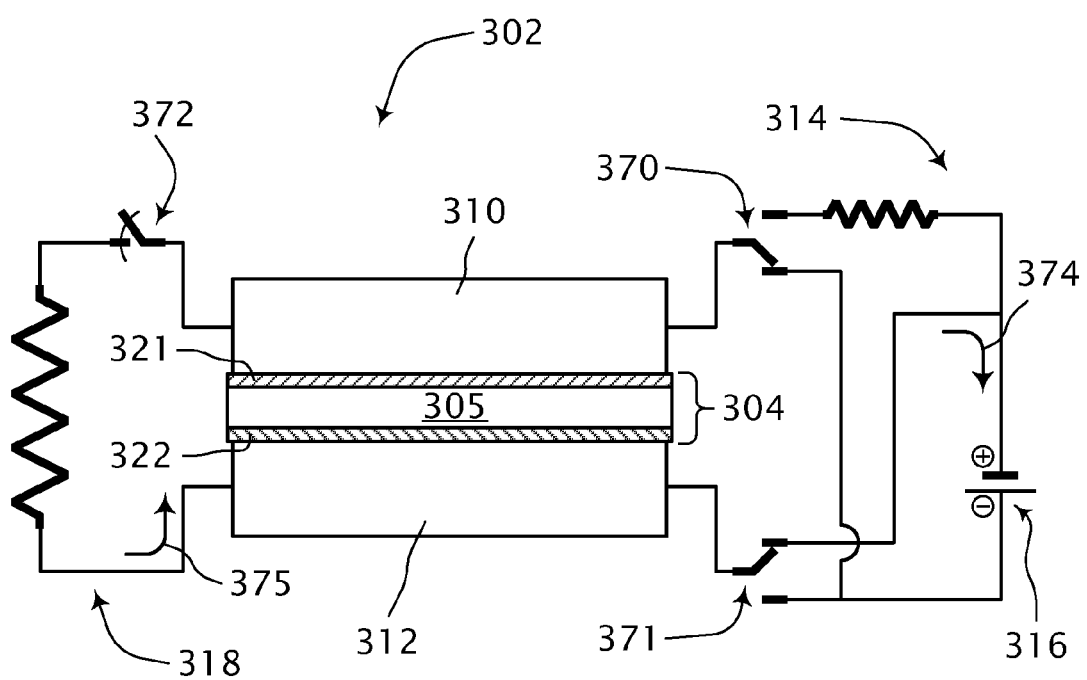
FIG. 16 is a schematic drawing of the fuel cell system of FIG. 14 shown with the second electrical circuit energized.

Referring now to FIGS. 15-16 the first electrical circuit 314 and the second electrical circuit 318 are interlocked such that during operation the first electrical circuit is energized for at least a portion of a period of time when the second electrical circuit is de-energized and the second electrical circuit is energized for at least a portion of a following period of time when the first electrical circuit is de-energized. During operation the second electrical circuit 318 is alternately opened and closed for a first predetermined period of time while the first electrical circuit 314 is cyclically toggled between fuel processing and storage recharge cycles for a second predetermined period of time.

Referring now to FIG. 15, the fuel cell system 302 is illustrated in a fuel processing cycle wherein switches 370 and 371 are in fuel processing positions such that a positive terminal of an energy storage device 316 is in electrically conductive communication with the first catalytic electrode 321 and a negative terminal of the energy storage device in electrically conductive communication with the second catalytic electrode 322 causing electrical current to flow in the first electrical circuit 314 in the direction of the arrow 373. During the fuel processing cycle, switch 372 is positioned to open the second electrical circuit 318 resulting in no current flow therethrough. During the fuel processing cycle, the energy storage device provides the process energy for removing carbon monoxide (CO) poisons formed on first catalytic electrode 321, and for the electrochemical reaction for formation of hydrogen.

Referring now to FIG. 16, the fuel cell system 302 is illustrated in a power generation cycle wherein the position of switches 370 and 371 change to recharge positions such that the positive terminal of the energy storage device 316 is in electrically conductive communication with the second catalytic electrode 322 and the negative terminal of the energy storage device is in electrically conductive communication with the first catalytic electrode 321 causing electric current to flow in the first electrical circuit 314 in the direction of the arrow 374, thereby replenishing the energy storage device 316. In addition, the switch 372 is positioned to close the second electrical circuit 318 thereby providing the energy output in the form of the second electrical potential and causing electrical current to flow in the direction of arrow 375.

Figure 17:
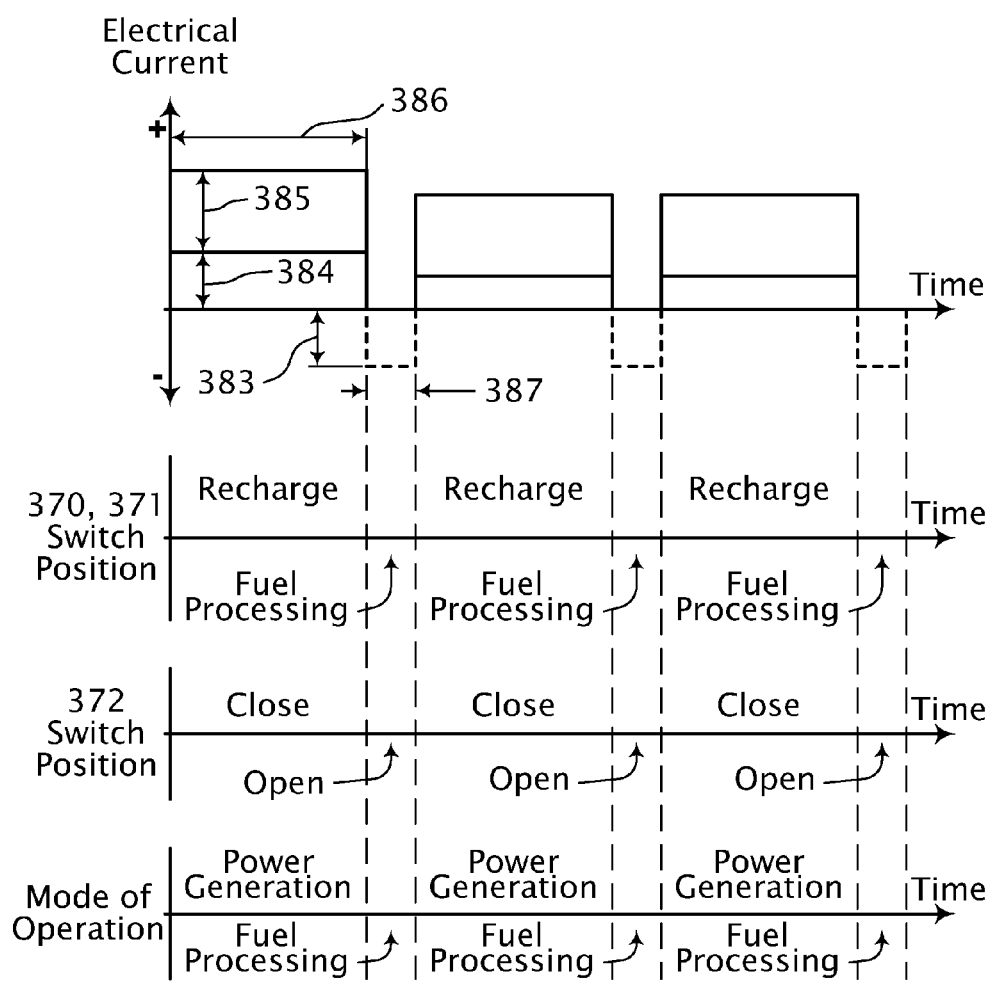
FIG. 17 is a graph of operational parameters of the fuel cell system during fuel processing and power generation cycles.

Referring to FIGS. 15-17, during the power generation cycle, the electric current is shown as positive value when switch 372 is closed and switches 370, 371 are in the recharge positions. The relative magnitude of the electric current flowing in the first electrical circuit 314 for recharging the energy storage device 316 is illustrated on FIG. 17 as arrow 384; and the relative magnitude of the excess electrical current flowing in the second electrical circuit 318 for consumption by the electrical load is illustrated on FIG. 17 as arrow 385. Preferably, the magnitude of the electrical current required for recharging the energy storage device 316 is less than that available for consumption by the electrical load. In addition it is preferred that the total energy consumed for recharging is less than the energy available for consumption by the electrical load during the entire power generation cycle.

Still referring to FIGS. 15-17, during the fuel processing cycle, electrical current flowing from the energy storage device 316 is shown as a negative value when switches 370, 371 are in the fuel processing positions and switch 372 is open. The magnitude of the electrical current required to provide the process energy for the hydrogen formation reaction is illustrated on FIG. 17 as arrow 383. During the fuel processing cycle, essentially no current flows in the second electrical circuit 318. Preferably, the process energy is less than the total energy available for consumption by the electrical load.

In addition, a first period of time 387 during which switches 370, 371 are in the fuel processing positions and switch 372 is open is preferably less than a second period of time 386 during which switch 372 is closed and switches 370, 371 are in the recharge positions. Preferably, the first period of time 387 is from about 0.01 seconds to about 10 seconds and the second period of time 386 is from about 0.5 minutes to about 10 minutes. Such cyclical switching between the fuel processing and the power generating cycles allows one electrode-electrolyte membrane to be used for both fuel processing and power generation, thus reducing the complexity of the fuel cell system 302.

While the first and second periods of time are preferred to be from about 0.01 seconds to about 10 seconds and from about 0.5 minutes to about 10 minutes, respectively, the present invention is not limited in this regard as other time durations may be used including but not limited to a performance based control including selecting the second period of time considering parameters indicative of degradation of power generation performance and selecting the first period of time based on fuel processing requirements corresponding to the magnitude of poisons formed on first catalytic electrode 21 during the power generation cycle. Selecting the first and second periods of time in this manner can increase overall power output and minimize energy requirements for fuel processing thereby improving fuel cell system efficiency. Parameters indicative of degradation of power generation performance used in the performance based control include fuel temperature, electrode temperature, fuel flow rate, oxidant flow rate, electric load, power output, and voltage across the fuel cell system and individual cells.

Figure 18:
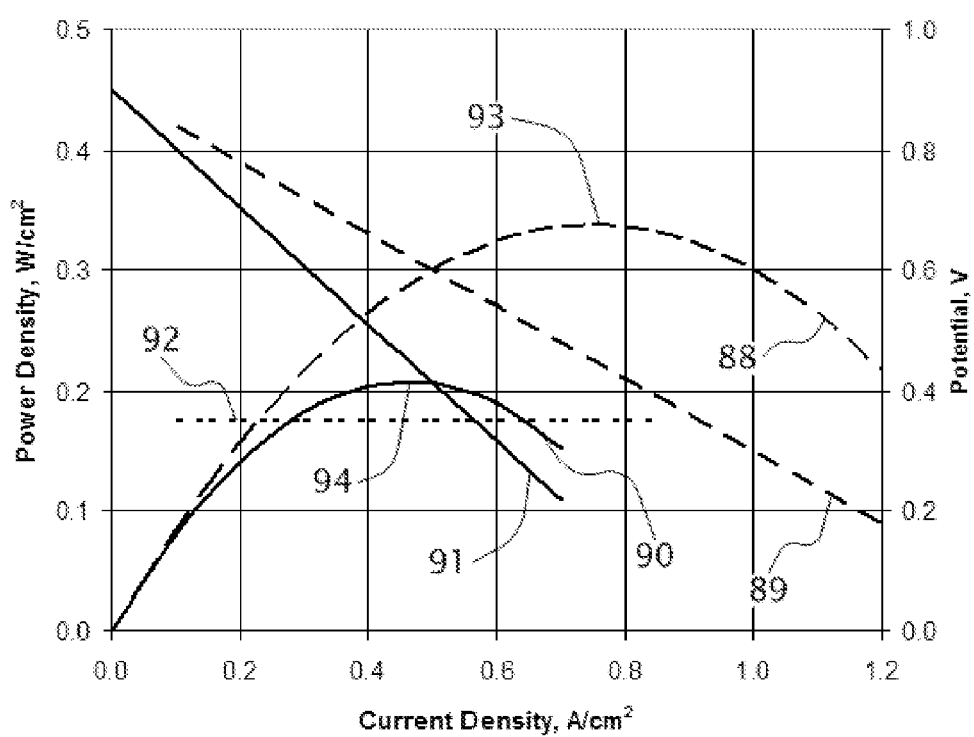
FIG. 18 is a graph of voltage and power density as a function of current density for the fuel cell system.

As shown in FIG. 18, curve 88, the initial power density of the fuel cell system varies as a function of current density. Similarly, curve 89 illustrates the initial voltage across the fuel cell system varies as a function of current density. The fuel cell system illustrated has a peak power density of approximately 0.34 $W/cm^2$ as designated by point 93. After three minutes of operation, poisons build up on the first catalytic electrode 21 resulting in a degradation of fuel cell system performance. After the three minute period of operation, power density of the fuel cell is degraded as illustrated by curve 90 and voltage across the fuel cell system is degraded as illustrated by curve 91. The degradation in fuel cell performance reduces the peak power density to approximately 0.21 $W/cm^2$, as illustrated by point 94. Power output of the fuel cell system is consumed by an external load of approximately 0.175 $W/cm^2$ as illustrated by line 92. The performance based control logic temporarily interrupts power generation in order to remove poisons from the first catalytic electrode 21 in the fuel reprocessing cycle, prior to the peak power density 94 decreasing below the external load 92. The performance based control logic is advantageous for fuel cells required to supply power for transient loads because the second period of time can be adjusted as a function of load.

Referring to FIG. 19, the fuel cell systems 302 can be assembled in a bipolar stack 366. Each of the fuel cell systems 302 include an electrode-electrolyte assembly 304 disposed between a first conduit 310 and a second conduit 312. For illustration, a plurality of fuel cell systems 302 can be assembled in the bipolar stack 366 using bipolar separator plates 369 positioned between adjacent first conduits 310 and second conduits 312 for maintaining electrically conductive communication therebetween. A first terminal conductor 377 is positioned on one end of the fuel cell system 302 between a dielectric cover 368 and the first conduit 310 adjacent thereto; and a second terminal conductor 379 is positioned on an opposing end of the fuel cell system between another of the dielectric covers and the second conduit 312 adjacent thereto. The first and second terminal conductors 377, 379 engage adjacent first and second conduits 310, 312, respectively to provide electrically conductive communication therewith. The dielectric covers insulate terminal ends of the bipolar stack 366.

The fuel cell system 302 also includes a first electrical circuit 314 having an energy storage device 316 for providing an electrical potential across the first and second terminal conductors 377, 379. A second electrical circuit 318 is also connected across the first and second terminal conductors 377, 379 for consuming electrical energy output therefrom. The first electrical circuit 314 is shown with switches 370, 371 in the fuel processing cycle and switch 372 in the open position. The bipolar stack 366 includes interlocking circuitry and is configured to operate similar to that described above for the single cell fuel cell systems 302 of FIGS. 11-14.

The present invention includes a method for operating a fuel cell system 2. The method for operating the fuel cell system 2 includes the first step of providing a first electrode-electrolyte assembly 4 having a first catalytic electrode 21 coupled to one side of the first electrode-electrolyte assembly, and a second catalytic electrode 22 coupled to a generally opposite side of the first electrode-electrolyte assembly, a first conduit 10 in fluid communication with the first catalytic electrode; a second electrode-electrolyte assembly 6 having a third catalytic electrode 23 coupled to one side of the second electrode-electrolyte assembly, and a fourth catalytic electrode 24 coupled to a generally opposite side of the second electrode-electrolyte assembly, an electrically conductive mesh 8 having a plurality of apertures extending therethrough, the mesh being positioned between and in sealing engagement with the second catalytic electrode and the third catalytic electrode wherein the second and third catalytic electrode engage each other through the apertures, a second conduit 12 in fluid communication with the fourth catalytic electrode, a first electrical circuit 14 including an electrical energy storage device 16 and a second electrical circuit 18.

The method of operating the fuel cell system 2 also includes the steps of supplying a fuel, for example an aqueous solution or gaseous mixture including methanol, hexose, fructose and/or hydrogen which may contain as much as 1.5% by volume CO impurity through the first conduit 10, preferably the fuel being at ambient temperature for at least a portion of time during operation of the fuel cell system and flowing an oxidant through the second conduit 12. The method of operating the fuel cell system 2 further includes the steps of establishing electrically conductive communication between a positive terminal of the energy storage device 16, the first conduit 10 and the first catalytic electrode 21. Electrically conductive communication is also established between a negative terminal of the energy storage device 16, the mesh 8 and the second catalytic electrode 22. Connecting the energy storage device in this manner provides the process energy for activating an ambient temperature electrochemical reaction to form hydrogen and remove poisons from the first catalytic electrode.

The method of operating the fuel cell system 2 also includes the steps of charging the first catalytic electrode with hydrogen species and diffusing the hydrogen species through the first electrode-electrolyte assembly to the third catalytic electrode. By connecting the second electrical circuit 18 having an electrical consumer, across the second electrode-electrolyte assembly an energy output is generated across the second electrode-electrolyte assembly which causes the hydrogen to be consumed from the third catalytic electrode 23 and the oxidant to be consumed through the fourth catalytic electrode 24 in an electrochemical reaction. As a result, an electric current flows through the second electrical circuit 18.

The present invention also includes a method for operating a fuel cell system 302. The method for operating the fuel cell system 302 includes the first step of providing an electrode-electrolyte assembly having a first catalytic electrode coupled to one side of the electrode-electrolyte assembly, and a second catalytic electrode coupled to a generally opposite side of the electrode-electrolyte assembly, a first conduit in fluid communication with the first catalytic electrode, a second conduit in fluid communication with the second catalytic electrode, a first electrical circuit 314 including an electrical energy storage device 316, and a second electrical circuit 318.

The method of operation of the fuel cell system 302 includes the step of flowing an aqueous solution of a fuel having a complex organic structure through the first conduit 310, preferably the fuel being at ambient temperature and flowing an oxidant through the second conduit 312. The method of operation of the fuel cell system 302 includes the steps of establishing electrically conductive communication between a positive terminal of the energy storage device 316 and the first catalytic electrode and establishing electrically conductive communication between a negative terminal of the energy storage device 316 and the second catalytic electrode. Connecting the energy storage device in this manner provides the process energy for activating an ambient temperature electrochemical reaction to remove poisons from the first catalytic electrode and to form hydrogen fuel.

The method of operating the fuel cell 302 also includes the steps of charging the first catalytic electrode 310 with hydrogen. After a period of time, preferably for about 0.01 seconds to about 10 seconds, the first electrical potential is electrically disconnected from the fuel cell system 302. By subsequently connecting the second electrical circuit 318 having an electrical load in electrically conductive communication across the electrode-electrolyte assembly 304 an energy output is generated across the electrode-electrolyte assembly thereby consuming most of the hydrogen from the electrode-electrolyte assembly and the oxidant in an electrochemical reaction. As a result, an electric current flows through the second electrical circuit 318.

The method of operating the fuel cell system 302 includes interlocking the first electrical circuit 314 and the second electrical circuit 318 such that during operation the first electrical circuit is closed when the second electrical circuit is open; the second electrical circuit is closed when the first electrical circuit is open; and cyclically opening and closing the first electrical circuit and the second electrical circuit for predetermined periods of time. Preferably, the first electrical circuit is closed and the second electrical circuit is open for about 0.01 seconds to about 10 seconds and the second electrical circuit is cyclically closed and the first electrical circuit is open for about 0.5 minutes to about 10 minutes, in a recurring sequence of fuel processing and power generation cycles, respectively. The second electrical circuit 318 is cyclically opened and closed for a first predetermined period of time while the first electrical circuit 314 is cyclically toggled between fuel processing and storage recharge for a second predetermined period of time.

Table 1 lists data for tests 1-7 which defines examples of ranges of the bias voltage and current required in the first electrical circuit 14 of FIG. 1A. The bias current and voltages are sufficient to remove CO poisons from the first catalytic electrode 21. Supply of the bias voltage and current enables the fuel cell system 2 to maintain a current flow of about 6 amperes±0.01 amperes in the second electrical circuit 18 of FIG. 1A while maintaining voltage across the first catalytic electrode 21 and the fourth catalytic electrode 24 between about 0.5 volts and 0.61 volts. The examples listed in Table 1 correspond to the fuel cell system 2 of FIG. 1A having a mesh 8 defining an active area 32 of about 98 cm$^2$±0.2 cm$^2$ and a polymer electrolyte membrane 5 manufactured from Nafion® 117 made by Dupont™. About 98 cm$^2$±0.2 cm$^2$ of the electrolyte membrane is available for the electrochemical reaction of Equation 1. Thus, the examples listed in Table 1 correspond to a fuel cell system 2 having a current density of about 0.02 amperes/cm$^2$ to about 0.06 amperes/cm$^2$ maintained across the first catalytic electrode 21 and the fourth catalytic electrode 24. In addition, Table 2 provides the load voltage across and the current and current density in the second electrical circuit 18, for each of the tests 1-7.

For the examples listed in Table 1, the first, second, third and fourth catalytic electrodes 21, 22, 23 and 24, respectively, are manufactured from a platinum black catalyst, manufactured by BASF and have about 85 weight % platinum. Tests corresponding to the examples listed in Table 1 utilized a fuel cell system 2 with 1 liter/minute of a fuel consisting of 99.95% pure hydrogen gas mixed with either 50 ppm or 125 ppm CO poison supplied to the first conduit 10. In addition, 1 liter/minute of air having about 21 volume % oxygen was supplied to the second conduit 12 of the fuel cell system 2 corresponding to the examples of Table 1. While the tests 1-7 use carbon monoxide in gaseous hydrogen, the test data of Tables 1 and 2 is also applicable to fuel cell systems using aqueous organic fuels, because the CO conversion (Eq. 7) is also applicable to aqueous fuels.

TABLE 1

| Test No. | Test Parameters | Bias Voltage (Volts) in the first electrical loop 14 | Bias Current (Amperes) in the first electrical loop 14 | Bias Current Density (amperes/cm$^2$) |
|---|---|---|---|---|
| | 50 ppm CO poison in the fuel | | | |
| 1 | 60° C. | 0.085 to 0.167 | 0.250 to 2.0 | 0.003 to 0.020 |
| 2 | 50° C. | 0.078 to 0.115 | 0.250 to 2.0 | 0.003 to 0.020 |
| 3 | 40° C. | 0.065 to 0.123 | 0.250 to 2.0 | 0.003 to 0.020 |
| | 125 ppm CO poison in the fuel | | | |
| 4 | 60° C. | 0.024 to 0.164 | 0.250 to 2.0 | 0.003 to 0.020 |
| 5 | 60° C. | 0.025 to 0.132 | 0.250 to 2.0 | 0.003 to 0.020 |
| 6 | 50° C. | 0.107 to 0.136 | 0.250 to 2.0 | 0.003 to 0.020 |
| 7 | 40° C. | 0.049 to 0.117 | 0.250 to 2.0 | 0.003 to 0.020 |

TABLE 2

| Test No. | Test Parameters | Duration of CO in feed (seconds) | Load Voltage (Volts) in the second electrical circuit 18 | Current (Amperes) in the second electrical circuit 18 | Load Current Density (amperes/cm$^2$) |
|---|---|---|---|---|---|
| | 50 ppm CO in the fuel | | | | |
| 1 | 60° C. | 7,500 | 0.539 to 0.621 | 6.0 | 0.06 |
| 2 | 50° C. | 7,740 | 0.516 to 0.607 | 6.0 | 0.06 |
| 3 | 40° C. | 8,040 | 0.482 to 0.557 | 6.0 | 0.06 |
| | 125 ppm CO in the fuel | | | | |
| 4 | 60° C. | 5,520 | 0.578 to 0.611 | 6.0 | 0.06 |
| 5 | 60° C. | 7,515 | 0.486 to 0.614 | 6.0 | 0.06 |

TABLE 2-continued

| Test No. | Test Parameters | Duration of CO in feed (seconds) | Load Voltage (Volts) in the second electrical circuit 18 | Current (Amperes) in the second electrical circuit 18 | Load Current Density (amperes/cm$^2$) |
|---|---|---|---|---|---|
| 6 | 50° C. | 7,725 | 0.488 to 0.578 | 6.0 | 0.06 |
| 7 | 40° C. | 5,550 | 0.476 to 0.572 | 6.0 | 0.06 |

Test 1: 50 ppm CO Poison, 60° C.

As indicated in Tables 1 and 2 the fuel cell system 2 of test 1 demonstrated stable operation for about 7,500 seconds with a 50 ppm CO poison. In test 1 a bias voltage of about 0.085 to about 0.167 volts, a bias current of about 0.25 to about 2 amperes and a bias current density of about 0.003 amperes per cm$^2$ to about 0.02 amperes per cm$^2$ in the first electrical loop 14 was required at 60° C. Test 1 corresponds to a load voltage of about 0.54 volts to about 0.62 volts across, a load current of about 6.0 amperes and a current density of about 0.06 amperes per cm$^2$, in the second electrical circuit 18.

Test 2: 50 ppm CO Poison, 50° C.

As indicated in Tables 1 and 2 the fuel cell system 2 of test 2 demonstrated stable operation for about 7,740 seconds with a 50 ppm CO poison. In test 2 a bias voltage of about 0.078 to about 0.115, a bias current of about 0.25 to about 2.0 amperes and a bias current density of about 0.003 amperes per cm$^2$ to about 0.02 amperes per cm$^2$ in the first electrical loop 14 was required at 50° C. Test 2 corresponds to a load voltage of about 0.52 volts to about 0.61 volts across, a load current of about 6.0 amperes and a current density of about 0.06 amperes per cm$^2$, in the second electrical circuit 18.

Test 3: 50 ppm CO Poison, 40° C.

As indicated in Tables 1 and 2 the fuel cell system 2 of test 3 demonstrated stable operation for about 8,040 seconds with a 50 ppm CO poison. In test 3 a bias voltage of about 0.065 volts to about 0.123 volts, a bias current of about 0.25 to about 2.0 amperes and a bias current density of about 0.003 amperes per cm$^2$ to about 0.02 amperes per cm$^2$ in the first electrical loop 14 was required at 40° C. Test 3 corresponds to a load voltage of about 0.48 volts to about 0.56 volts across, a load current of about 6.0 amperes and a current density of about 0.06 amperes per cm$^2$, in the second electrical circuit 18.

Test 4: 125 ppm CO Poison, 60° C.

As indicated in Tables 1 and 2 the fuel cell system 2 of test 4 demonstrated stable operation for about 5,520 seconds with a 125 ppm CO poison. In test 4 a bias voltage of about 0.024 to about 0.164 volts, a bias current of about 0.25 to about 2.0 amperes and a bias current density of about 0.003 amperes per cm$^2$ to about 0.02 amperes per cm$^2$ in the first electrical loop 14 was required at 60° C. Test 4 corresponds to a load voltage of about 0.58 volts to about 0.61 volts across, a load current of about 6.0 amperes, and a current density of about 0.06 amperes per cm$^2$, in the second electrical circuit 18.

Test 5: 125 ppm CO Poison, 60° C.

As indicated in Tables 1 and 2 the fuel cell system 2 of test 5 demonstrated stable operation for about 7,515 seconds with a 125 ppm CO poison. In test 5 a bias voltage of about 0.025 to about 0.132 volts, a bias current of about 0.25 to about 2.0 amperes and a bias current density of about 0.003 amperes per cm$^2$ to about 0.02 amperes per cm$^2$ in the first electrical loop 14 was required at 60° C. Test 5 corresponds to a load voltage of about 0.49 volts to about 0.61 volts across, a load current of about 6.0 amperes and a current density of about 0.06 amperes per cm$^2$, in the second electrical circuit 18.

Test 6: 125 ppm CO Poison, 50° C.

As indicated in Tables 1 and 2 the fuel cell system 2 of test 6 demonstrated stable operation for about 7,725 seconds with a 125 ppm CO poison. In test 6 a bias voltage of about 0.107 to about 0.136 volts, a bias current of about 0.25 to about 2.0 amperes and a bias current density of about 0.003 amperes per cm$^2$ to about 0.02 amperes per cm$^2$ in the first electrical loop 14 was required at 50° C. Test 6 corresponds to a load voltage of about 0.49 volts to about 0.58 volts across, a load current of about 6.0 amperes and a current density of about 0.06 amperes per cm$^2$, in the second electrical circuit 18.

Test 7: 125 ppm CO Poison, 40° C.

As indicated in Tables 1 and 2 the fuel cell system 2 of test 7 demonstrated stable operation for about 5,550 seconds with a 125 ppm CO poison. In test 7 a bias voltage of about 0.049 volts to about 0.117 volts, a bias current of about 0.25 to about 2.0 amperes and a bias current density of about 0.003 amperes per cm$^2$ to about 0.02 amperes per cm$^2$ in the first electrical loop 14 was required at 40° C. Test 7 corresponds to a load voltage of about 0.48 volts to about 0.57 volts across, a load current of about 6.0 amperes and a current density of about 0.06 amperes per cm$^2$, in the second electrical circuit 18.

Although the present invention has been disclosed and described with reference to certain embodiments thereof, it should be noted that other variations and modifications may be made, and it is intended that the following claims cover the variations and modifications within the true scope of the invention.

What is claimed is:

1. A fuel cell system comprising:
   a first electrode-electrolyte assembly having a first catalytic electrode coupled to one side of said first electrode-electrolyte assembly, and a second catalytic electrode coupled to a generally opposite side of said first electrode-electrolyte assembly;
   a first conduit in fluid communication with said first catalytic electrode is configured to deliver fuel to said first catalytic electrode;
   a second electrode-electrolyte assembly having a third catalytic electrode coupled to one side of said second electrode-electrolyte assembly, and a fourth catalytic electrode coupled to a generally opposite side of said second electrode-electrolyte assembly;

an electrically conductive mesh positioned between and in sealing engagement with said second catalytic electrode and said third catalytic electrode, such that portions of said second and third catalytic electrodes engage each other through apertures defined by said mesh;

a second conduit in fluid communication with said fourth catalytic electrode configured to deliver oxidant thereto;

a first electrical circuit including an electricity source, in communication with said first catalytic electrode and said second catalytic electrode; and a second electrical circuit connected to said first conduit and said second conduit and configured to convey electrical current generated by said fuel cell system.

2. The fuel cell system of claim 1 wherein:

said electricity source has a positive terminal in electrically conductive communication with said first catalytic electrode and a negative terminal in electrically conductive communication with said second catalytic electrode, said electricity source being configured to provide process energy sufficient to form hydrogen ions and to remove poisons from said first catalytic electrode and to permit the hydrogen ions to diffuse through said first electrode-electrolyte assembly to said third catalytic electrode.

3. The fuel cell system of claim 2 further comprising:

a third electrical circuit in electrical communication with said second electrical circuit and configured to divert a portion of current flow from the second electrical circuit to said third electrical circuit for providing the process energy.

4. The fuel cell system of claim 2 further comprising:

an inductive device;

said inductive device being charged by the energy output to provide at least the process energy.

5. The fuel cell system of claim 1 wherein said first conduit is configured to deliver an aqueous solution of the fuel.

6. The fuel cell system of claim 1 wherein at least one of said meshes is embedded in at least one of said second catalytic electrode and said third catalytic electrode.

7. The fuel cell system of claim 1 wherein said second catalytic electrode and said third catalytic electrode comprise a common catalytic electrode and said mesh is embedded in said common catalytic electrode.

8. The fuel cell system of claim 1 further including:

a plurality of said fuel cell systems each having one of said first conduit, said first electrode-electrolyte assembly, said mesh, said second electrode-electrolyte assembly and said second conduit sequentially disposed one upon another in a stack;

an electrical conductor disposed between adjacent ones of said plurality of fuel cell systems and on terminal ends of said stack;

said second electrical circuit is connected to said terminal ends of said stack; and said plurality of said fuel cell systems are in electrically conductive communication with one another.

9. The fuel cell system of claim 1 wherein:

said first conduit, said first electrode-electrolyte assembly, said mesh, said second electrode-electrolyte assembly and said second conduit are configured to generate said electrical current.

10. The fuel cell system of claim 1 wherein said electricity source is configured to remove poisons from said first electrode at temperatures of about 15° C. to about 60° C.

11. The fuel cell system of claim 1 wherein:

said first electrode-electrolyte assembly, said mesh and said second electrode-electrolyte assembly are configured to operate at a current density of about 0.02 amperes per $cm^2$ to about 0.06 amperes per $cm^2$ and a temperature of about 40° C. to about 60° C.; and said electricity source is configured to remove carbon monoxide poisons from said first catalytic electrode at a voltage of about 0.024 volts to about 0.167 volts and a current density of about 0.003 amperes per $cm^2$ to about 0.02 amperes per $cm^2$.

* * * * *